US011726386B2

(12) United States Patent
Macdonald et al.

(10) Patent No.: US 11,726,386 B2
(45) Date of Patent: Aug. 15, 2023

(54) PLASMON COUPLING MATERIALS, METHODS OF MAKING PLASMON COUPLING MATERIALS, METHODS OF USING PLASMON COUPLING MATERIALS AND SYSTEMS AND DEVICES THAT INCLUDE PLASMON COUPLING MATERIALS

(71) Applicant: VANDERBILT UNIVERSITY, Nashville, TN (US)

(72) Inventors: Janet E. Macdonald, Nashville, TN (US); Richard F. Haglund, Jr., Nashville, TN (US); Nathan James Spear, Nashville, TN (US); Kent A. Hallman, Nashville, TN (US); Summer L. Arrowood, Nashville, TN (US); Roderick B. Davidson, II, Nashville, TN (US); Emil A. Hernandez-Pagan, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 234 days.

(21) Appl. No.: 17/221,013

(22) Filed: Apr. 2, 2021

(65) Prior Publication Data
US 2021/0311370 A1 Oct. 7, 2021

Related U.S. Application Data

(60) Provisional application No. 63/004,160, filed on Apr. 2, 2020.

(51) Int. Cl.
*G02F 1/35* (2006.01)
*B82Y 15/00* (2011.01)
(Continued)

(52) U.S. Cl.
CPC .............. *G02F 1/353* (2013.01); *B82Y 10/00* (2013.01); *B82Y 15/00* (2013.01); *B82Y 20/00* (2013.01); *G02F 2203/10* (2013.01)

(58) Field of Classification Search
CPC ..... G02F 1/353; G02F 2203/10; B82Y 10/00; B82Y 15/00; B82Y 20/00
See application file for complete search history.

(56) References Cited

U.S. PATENT DOCUMENTS 9,513,226 B2 * 12/2016 Pang ................... G01N 21/658
2006/0034729 A1 * 2/2006 Poponin ................ G02B 5/204
422/82.05

OTHER PUBLICATIONS

Bachelier, G., et al., "Multipolar second-harmonic generation in noble metal nanoparticles," J. Opt. Soc. Am. vol. 25, No. 6, (2008), pp. 955-960.

(Continued)

*Primary Examiner* — Georgia Y Epps
*Assistant Examiner* — Don J Williams
(74) *Attorney, Agent, or Firm* — Thomas | Horstemeyer, LLP

(57) ABSTRACT

The present disclosure provides for materials (e.g., films, mixtures, and colloidally suspended in solution) including two types of particles (e.g., nanoparticles) that exhibit harmonic surface plasmon resonances (SPR), where these are referred to as harmonically paired set of particles. The present disclosure provides for harmonically paired set of particles, where the particles are separated by a dielectric layer. The dielectric layer has a thickness such that direct electron transfer does not occur between the harmonically paired set of particles. The harmonically paired set of particles can be included in harmonically paired set of particle system or devices which can be a component in measurement systems or devices.

20 Claims, 10 Drawing Sheets

(51) Int. Cl.
B82Y 10/00 (2011.01)
B82Y 20/00 (2011.01)

(56) References Cited

OTHER PUBLICATIONS

Mcmahon, M.D., et al., "Second harmonic generation from resonantly excited arrays of gold nanoparticles," Appl. Phys. B 87 (2007), pp. 259-265.
Li, K., et al., "Enhanced second harmonic generation in a self-similar chain of metal nanospheres," Physical Review B 72 (2005) (4 pages).
Fontana, J., et al., "Linear and nonlinear optical characterization of self-assembled, large-area gold nanosphere metasurfaces with sub-nanometer gaps," Optics Express, vol. 24, No. 24 (2016) (11 pages).
Shaviv, E., et al., "Synergistic Effects on Second Harmonic Generation of Hybrid CdSe—Au Nanoparticles," ACS Nano, vol. 4, No. 3, (2010), pp. 1529-1538.
Danckwerts, M., et al., "Optical Frequency Mixing at Coupled Gold Nanoparticles," Physical Review Letters, PRL 98, 026104 (2007) *(4 pages).
Hubert, C., et al., "Role of surface plasmon in second harmonic generation from gold nanorods," Appl. Phys. Lett. 90 (2007) (4 pages).
Thyagarajan, K., et al., "Augmenting Second Harmonic Generation Using Fano Resonances in Plasmonic Systems," Nano Letters, 13 (2013), pp. 1847-1851.
Zhang, Y., et al., "Three-Dimensional Nanostructures as Highly Efficient Generators of Second Harmonic Light," Nano Letters, 11 (2011), pp. 5519-5523.
Celebrano, M., et al., "Mode matching in multiresonant plasmonic nanoantennas for enhanced second harmonic generation," Nature Nanotechnology, vol. 10 (2015) pp. 412-417.
Jais, P.M., et al., "Plasmon-enhanced second harmonic generation in semiconductor quantum dots close to metal nanoparticles," Papers in Physics, vol. 3, Art. 030002 (2011) (5 pages).
Grinblat, G., et al., "High-Efficiency Second Harmonic Generation from a Single Hybrid ZnO Nanowire/Au Plasmonic Nano-Oligomer," Nano Letters 14, (2014), pp. 6660-6665.
Linnenbank, H., et al., "Second harmonic generation spectroscopy on hybrid plasmonic/dielectric nanoanennas," Light:Science & Applications 5 (2016) (7 pgs).
Singh, M. R., "Enhancement of the second-harmonic generation in a quantum dot-metallic nanoparticle hybrid system," Nanotechnology 24 (2013) (7 pgs).

Chang, R., et al., "Effects of gain medium on the plasmonic enhancement of Forster resonance energy transfer in the vicinity of a metallic particle or cavity," Optics Exress, vol. 22, No. 22 (2014) (11 pgs).
Liaw, J., et al., "Plasmon-mediated excitation modulation of FRET by silver nanoshell," Microelectronic Engineering, 138 (2015), pp. 122-127.
Szmacinski, H., et al., "Effect of plasmonic nanostructures and nanofilms on fluorescence resonance energy transfer," J. Biophoton. 2., No. 4 (2009), pp. 243-252.
Tong, L., et al., "Bright Three-Photon Luminescence from Gold/Silver Alloyed Nanostructures for Bioimaging with Negligible Phtothermal Toxicity," Angew. Chem. Int. Ed. 49 (2010), pp. 3485-3488.
Bardhan, R., et al., "Theranostic Nanoshells: From Probe Design to Imaging and Treatment of Cancer," Accounts of Chemical Research, vol. 44, No. 10 (2011), pp. 936-946.
Xie, Y., et al., "Metallic-like Stoichiometric Copper Sulfide Nanocrystals: Phase- and Shape-Selective Synthesis, Near-Infrared Surface Plasmon Resonance Properties, and Their Modeling," ACS NANO, vol. 7, No. 8 (2013), pp. 7352-7369.
Marin, B., et al., "Plasmon-Enhanced Two-Photon Absorption in Photoluminescent Semiconductor Nanocrystals," ACS Photonics 3 (2016), pp. 526-531.
Motl, N., et al., "Au—Cu Alloy Nanoparticles with Tunable Compositions and Plasmonic Properties: Experimental Determination of Composition and Correlation with Theory," J. Phys. Chem. 114 (2010), pp. 19263-19269.
Brzoska, J.B., et al., "Evidence of a transition temperature for the optimum deposition of grafted monolayer coatings," Nature, vol. 360 (1992) pp. 719-721.
Goss, C., et al., "Application of (3-Mercaptopropyl)trimethoxysilane as a Molecular Adhesive in the Fabrication of Vapor-Deposited Gold Ectrodes on Glass Substrates," Anal. Chem. 63 (1991) pp. 85-88.
Palomba, S., et al., "Nonlinear plasmonics with gold nanoparticle antennas," J. Opt. A: Pure Appl. Opt. 11 (2009) (6 pgs).
Bachelier, G., et al., "Origin of the optical second-harmonic generation in spherical gold nanoparticles: local surface and non-local bulk contributions," Physics Optics, Jul. 19, 2011 (5 pgs).
Ludwig, J., et al., "Ultrafast Hole Trapping and Relaxation Dynamics in p-Type CuS Nanodisks," J. Phys. Chem. Lett. 6 (2015), pp. 2671-2675.
Liu, X., et al., "Extinction coefficient of gold nanoparticles with different sizes and different capping ligands," Collids and Surfaces B: Biointerfaces 58 (2007), pp. 3-7.
Xiao, L., et al., "Near-infrared radiation absorption properties of covellite (CuS) using first-principles calculations," AIP Advances 6 (2016) (7 pgs).

* cited by examiner

FIG. 1A
FIG. 1B
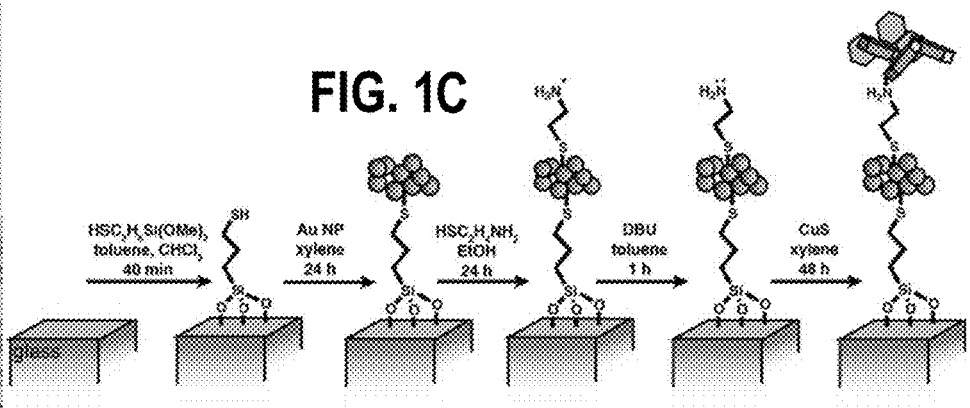
FIG. 1C
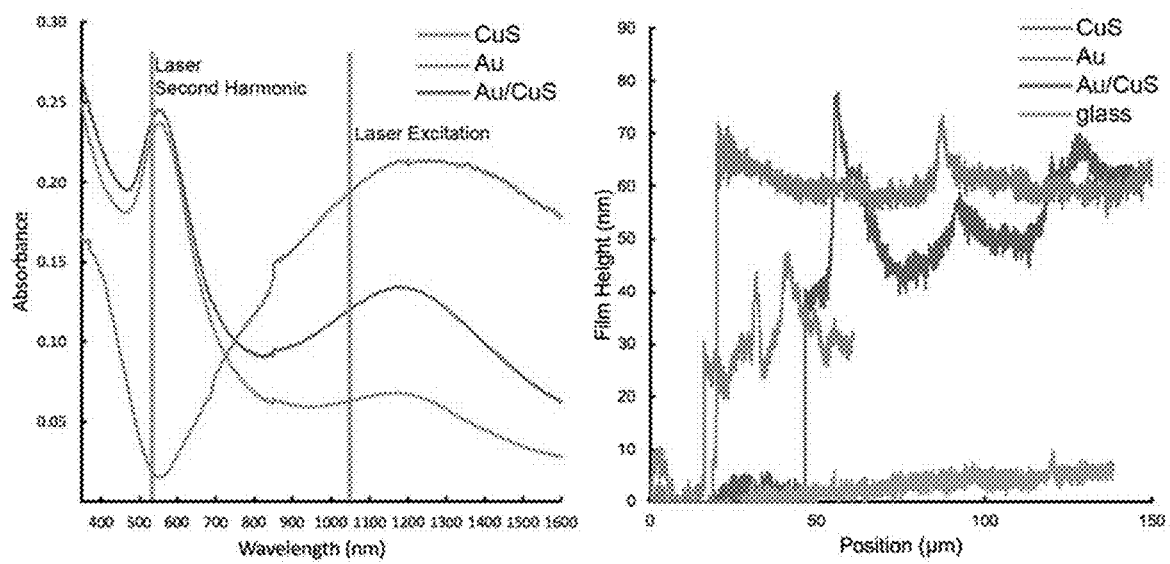
FIG. 2A
FIG. 2B

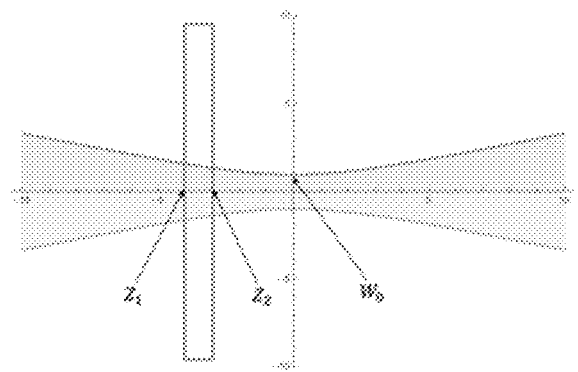 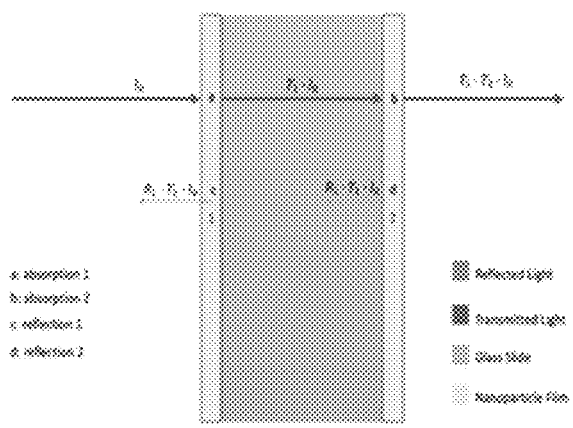
FIG. 10A  FIG. 10B
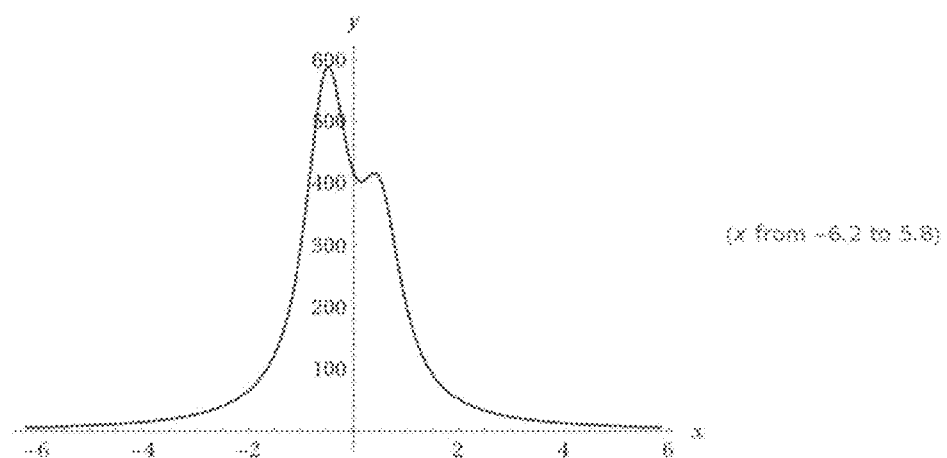
FIG. 11

US 11,726,386 B2

PLASMON COUPLING MATERIALS, METHODS OF MAKING PLASMON COUPLING MATERIALS, METHODS OF USING PLASMON COUPLING MATERIALS AND SYSTEMS AND DEVICES THAT INCLUDE PLASMON COUPLING MATERIALS

CLAIM OF PRIORITY TO RELATED APPLICATION

This application claims priority to U.S. provisional application entitled "PLASMON COUPLING MATERIALS, METHODS OF MAKING PLASMON COUPLING MATERIALS, AND METHODS OF USING PLASMON COUPLING MATERIALS AND DEVICES" having Ser. No. 63/004,160 filed on Apr. 2, 2020, which is entirely incorporated herein by reference.

FEDERAL FUNDING

This invention was made with government support under ECCS1509740 and PHYS1852158 awarded by the National Science Foundation. The government has certain rights in the invention.

BACKGROUND

Hybrid structures comprising metallic and semiconductor nanoparticles can exhibit enhanced surface plasmon resonances (SPR) due to dipole-dipole interactions that couple an excitonic state of the semiconductor to the plasmonic resonance of the metal. While the plasmonic effects of metal nanoparticles on energy transfer have been explored, the effect of plasmonic coupling of harmonically resonant metal and semi-metallic nanoparticles is relatively unexplored.

SUMMARY

The present disclosure provides for harmonically paired set of particles, systems or devices including the harmonically paired set of particles, methods of use, and methods of making.

In an aspect, the present disclosure provides for a structure, comprising: a harmonically paired set of particles, wherein the particles are separated by a dielectric layer, where the dielectric layer is of a thickness such that direct electron transfer does not occur between the harmonically paired set of particles. The harmonically paired set of particles can have a plasmonic resonance of one of the paired particles that is coincident with the harmonics of the plasmonic resonance of the other of the paired particles.

In an aspect, the harmonically paired set of particles can include a first particle and a second particle. In an embodiment, the first particle is selected from the group consisting of: Au, Ag, Al, Cu, Pt, Pd, Ga, In, Tl, Sn, Pb, and Bi and the second particle is selected from the group consisting of: CuS, ZnO, Sn-doped $In_2O_3$ (ITO), In-doped $SnO_2$, compound III-V semiconductors, compound III-V semiconductors, and copper chalcogenides. In another embodiment, the first particle is selected from the group consisting of: Au, Ag, Al, Cu, Pt, Pd, Ga, In, Tl, Sn, Pb, and Bi and the first particle is selected from the group consisting of: Au, Ag, Al, Cu, Pt, Pd, Ga, In, Tl, Sn, Pb, and Bi, where the first particle and the second particle are not the same. The dielectric layer can be about 3 to 500 nm thick and the first particle and the second particle independently have a longest dimension of about 4 to 20 nm.

In an aspect, the dielectric layer can be made of a ligand that is a bi-functional organic ligand. The bi-functional organic ligand is selected from: aminoethanethiol and mercapto-acids, dithiols, and the amino-thiols. In another aspect, the dielectric layer can be made of an inorganic dielectric material. The inorganic dielectric material is selected from: $SiO_2$, $TiO_2$, $SnO_2$, and $Al_2O_3$.

In an aspect, the structure including the harmonically paired set of particles can be an optical component such as: filter, optically selective switch, optically selective reflector, non-phase matched harmonic generator, parametric up- or down-converter, tunable beam deflector, or functionalized absorber-activator pair for drug delivery.

In aspect, the present disclosure provides for a harmonically paired nanoparticle system comprising: a substrate, a harmonically paired set of particles disposed adjacent the substrate, and a dichroic plate, wherein the particles of the harmonically paired set of particles are separated by a dielectric layer, where the dielectric layer is of a thickness such that direct electron transfer does not occur between the harmonically paired set of particles. The harmonically paired set of particles include those described above and herein. The substrate can be transmissive or reflective.

In an aspect, the present disclosure provides for a measurement system comprising: a laser, a focusing optic system, a harmonically paired nanoparticle system, a filter, and a detector; wherein the laser directs a laser light onto the focusing optic system which directs the laser light onto the harmonically paired nanoparticle system, wherein the harmonically paired nanoparticle system up converts the laser light, wherein the filter allows select harmonics to pass to the detector, where the detector detects the select harmonics; wherein the harmonically paired nanoparticle system comprises a substrate, a harmonically paired set of particles disposed adjacent the substrate, and a dichroic plate, wherein the particles of the harmonically paired set of particles are separated by a dielectric layer, where the dielectric layer is of a thickness such that direct electron transfer does not occur between the harmonically paired set of particles.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1A illustrates TEM and schematics of CuS nanoparticles. FIG. 1B illustrates TEM and schematic of Au nanoparticles. FIG. 1C illustrates schematic of the film deposition process.

FIG. 2A illustrates UV-vis-NIR spectrophotometry of typical nanoparticle films deposited on glass microscope slides. The fundamental of the laser and the second harmonic in the SHG experiments are denoted by grey lines. FIG. 2B illustrates profilometry traces of Au only film (orange), CuS only film (green), bare glass (grey), and hybrid Au—CuS nanoparticle film (blue). Low positions correspond to bare glass where the nanoparticle films have been wiped away.

FIG. 6A illustrates bare, unfunctionalized glass microscope slide after cleaning. FIG. 6B illustrates the sample surface with Au nanoparticle layer. FIG. 6C illustrates the hybrid film deposited without DBU treatment leading to aggregation and deposition of CuS islands.

FIG. 8B illustrates the peak LIA voltage after the annealing effect is no longer observable in a sample with less nanoparticle loading than that shown in FIG. 8A.

FIGS. 9A and 9B illustrates hybrid samples taken at different spots on the same sample. Optical power of laser after transmission through (FIG. 9C) Au only film and (FIG. 9D) CuS only film.

FIG. 10A illustrates the z-scan layout of the experiment, showing the coordinates of the front and back surface of the glass slide. FIG. 10B illustrates a schematic showing the incident, transmitted and reflected beams at the film-glass interfaces.

FIG. 11 illustrates the calculation of one-photon absorption (arbitrary units) as a function of distance from the focal plane in the hybrid gold-covellite structures, using the equation for l(z) given above and assuming a laser wavelength of 1050 nm. The z axis is scaled in mm, and the Rayleigh range is 0.529 µm, for a focal-spot radius of 13.5 µm. The laser is assumed incident from the left.

DETAILED DESCRIPTION

Figure 3A:
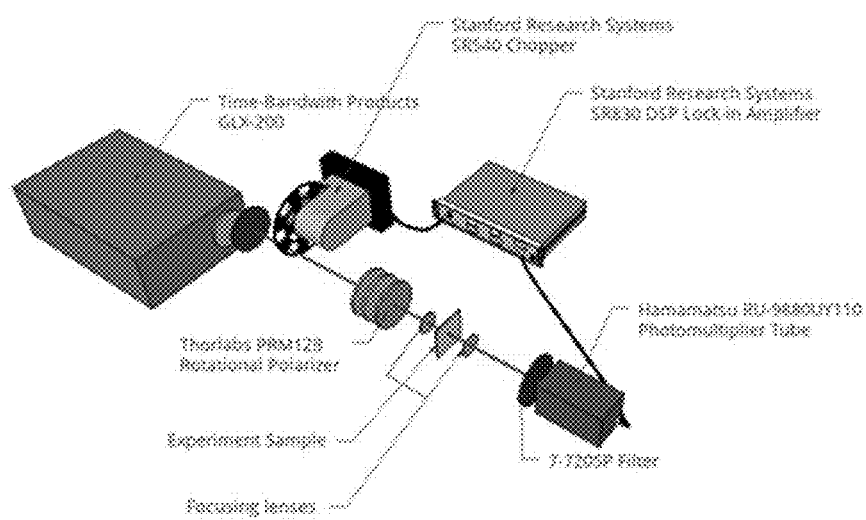
FIG. 3A illustrates the SHG experimental design.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of chemistry, polymer chemistry, material science, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of physics, chemistry, microbiology, and/or molecular biology. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

The present disclosure provides for materials (e.g., films, mixtures, and colloidally suspended solutions) including two types of particles (e.g., nanoparticles) that exhibit harmonic surface plasmon resonances (SPR) and these are referred to as harmonically paired set of particles. This is the condition that the resonance of one particle is at a harmonic of the other. These materials can exhibit enhanced harmonic generation, and/or multiphoton photoluminescence compared to the sum of the output from the component parts of the film. Embodiments of the present disclosure can be used in chemical detection, biological detection or imaging, therapeutics, theranostics, and the like.

In the Example 1, both second and third harmonic generation and multiphoton photoluminescence are enhanced in the bilayer films compared to films of the individual nanoparticle components. In an example system (Au/CuS nanoparticles) the SPR of the Au is at the second harmonic of the CuS SPR, while other particle systems can operate at any even-order harmonics, such as the fourth and sixth. Odd-order harmonics (e.g., third and fifth) can be generated as well.

The present disclosure provides for harmonically paired sets of particles that can be included in substrates or suspended in solution as well as systems and devices that include the harmonically paired set of particles. The particles are separated by a dielectric layer, where the dielectric layer has a thickness such that direct electron transfer does not occur between the harmonically paired set of particles. The structure can be an optical component within a system, for example a measurement system. The optical component can be a filter, an optically selective switch, an optically selective reflector, a non-phase matched harmonic generator, a parametric up- or down-converter, a tunable beam deflector, or a functionalized absorber-activator pair for drug delivery. The measurement system can be used to measure harmonic generation, photoluminescence, polarization, nonlinear absorption, and nonlinear index of refraction.

The harmonically paired set of particles has a plasmonic resonance of one of the paired particles that is coincident with the harmonics of the plasmonic resonance of the other of the paired particles. Details regarding how the harmonically paired set of particles can be made are provided in Example 1. The harmonically paired set of particles can include a first particle and a second particle. In an aspect, the first particle is a metal and the second particle is a semiconductor. In this regard, the first particle can be: Au, Ag, Al, Cu, Pt, Pd, Ga, In, Tl, Sn, Pb, and Bi, and the second particle can be: CuS, ZnO, Sn-doped $In_2O_3$ (ITO), In-doped $SnO_2$, compound III-V semiconductors, compound III-V semiconductors, and copper chalcogenides. In particular, the second particle can be AlN, GaN, AlP, GaP, InP, AlAs, GaAs, InAs, InSb, and ternary compounds involving a mix of these elements. In an aspect, the copper chalcogenides can be: CuS, $Cu_{2-x}S$, $CuInS_2$, $CuGaS_2$, $Cu_{2-x}Se$, $Cu(InGa)S_2$, $Cu(InGa)Se_2$, or $CuTe_2$.

In another aspect, the first particle can be a first metal and the second particle can be a second metal, where the first metal and the second metal are different. The first metal and the second metal can be independently selected from: Au, Ag, Al, Cu, Pt, Pd, Ga, In, Tl, Sn, Pb, and Bi.

The first particle and the second particle can independently have a longest dimension (e.g., radius, length, etc) of about 2 to 50 nm, about 4 to 50 nm, about 4 to 30 nm, or about 4 to 20 nm. The first particle and the second particle can independently be spherical, elliptical, or polyhedral in geometry.

In an aspect, the dielectric layer, disposed between the first particle and the second particle, can be made of a ligand that is a bi-functional organic ligand. The bi-functional organic ligand can be: aminoethanethiol and mercapto-acids, mercapto-alcohols, dithiols, and the amino-thiols. In particular, the bi-functional organic ligand can be: mercaptopropionic acid, mercapto alkyl-acids, mercapto alkyl-alcohols, mercaptoundecanoic acid, mecapto-phenylacetic acid, ethanedithiol, an alkyl-dithiol, benzenedithiol, poly(ethylene glycol) dithiol, biphenyldithiol, toluenedithiol, thiadiazoledithiol, aminoethanethiol, an amino-alkylthiols, aminothiophenol, and aminobenzylmercaptan.

In another aspect, the dielectric layer can be made of an inorganic dielectric material, for example a metal or metalloid oxide. In an aspect, the inorganic dielectric material can be: $SiO_2$, $TiO_2$, $SnO_2$, diamond, and $Al_2O_3$.

The dielectric layer can have a thickness of about 3 to 500 nm, about 3 to 400 nm, about 3 to 300 nm, about 3 to 200 nm, about 2 to 100 nm, or about 3 to 50 nm, where the dielectric layer has a thickness such that direct electron transfer does not occur between the harmonically paired set of particles. The thickness will vary depending upon the type of first particle, the type of second particle and the material of the dielectric layer.

In an embodiment, the first particles are in a first layer and the second particles are in a second layer and the dielectric layer is positioned between the first layer and the second layer. The first layer or the second layer are adjacent a surface of a substrate. The substrate can be a material that has transmissive properties (e.g. greater than 70% transmissivity, greater than 80% transmissivity, greater than 90% transmissivity, greater than 95% transmissivity, or about 100% transmissivity), for example glass. In another aspect, the substrate can be a material that is reflective, for example a mirror. The surface of the substrate can be flat or curved, smooth or rough. Additional details are provided in FIGS. 14 and 15.

In another aspect, a plurality of harmonically paired set of particles are within a first mixed layer. Each harmonically paired set of particles includes a first particle and a second particle, where each harmonically paired set of particles has its own dielectric layer independent of the dielectric layer of other harmonically paired set of particles. For example, a plurality of harmonically paired set of particles can be disposed in a material such as a polymer that has transmissive properties (e.g. greater than 70% transmissivity, greater than 80% transmissivity, greater than 90% transmissivity, greater than 95% transmissivity, or about 100% transmissivity). The first mixed layer is adjacent a surface of a substrate (e.g., having transmissive properties or reflective properties).

In another aspect, a plurality of harmonically paired set of particles are within a colloidally suspended solution. Each harmonically paired set of particles includes a first particle and a second particle connected to one another by its own dielectric layer independent of the dielectric layer of other harmonically paired set of particles. The solution can water, alcohol, ether, acetone, alkanes, or benzene derivatives. This system might be implemented when one would want to determine where things are accumulating in a flowing system. For example, this can occur in a pipeline or a human blood vessel. The nanoparticles are injected in and then you scan with the fundamental harmonic across the system and wherever you get second harmonic signal back is where the nanoparticles ended up, be that a cancerous tissue or a blockage in a pipe, etc.

In an aspect, the harmonically paired set of particles exhibit greater harmonic generation, multiphoton photoluminescence, or both as compared to the sum of the output from the component parts of the harmonically paired set of particles. In one particular aspect, the second harmonic of the harmonically paired set of particles is greater than the second harmonic sum of the output from the component parts of the harmonically paired set of particles. In another aspect, the third harmonic of the harmonically paired set of particles is greater than the third harmonic sum of the output from the component parts of the harmonically paired set of particles. In yet another aspect, the even harmonics of the harmonically paired set of particles is greater than the corresponding even harmonics sum of the output from the component parts of the harmonically paired set of particles.

Figure 14:
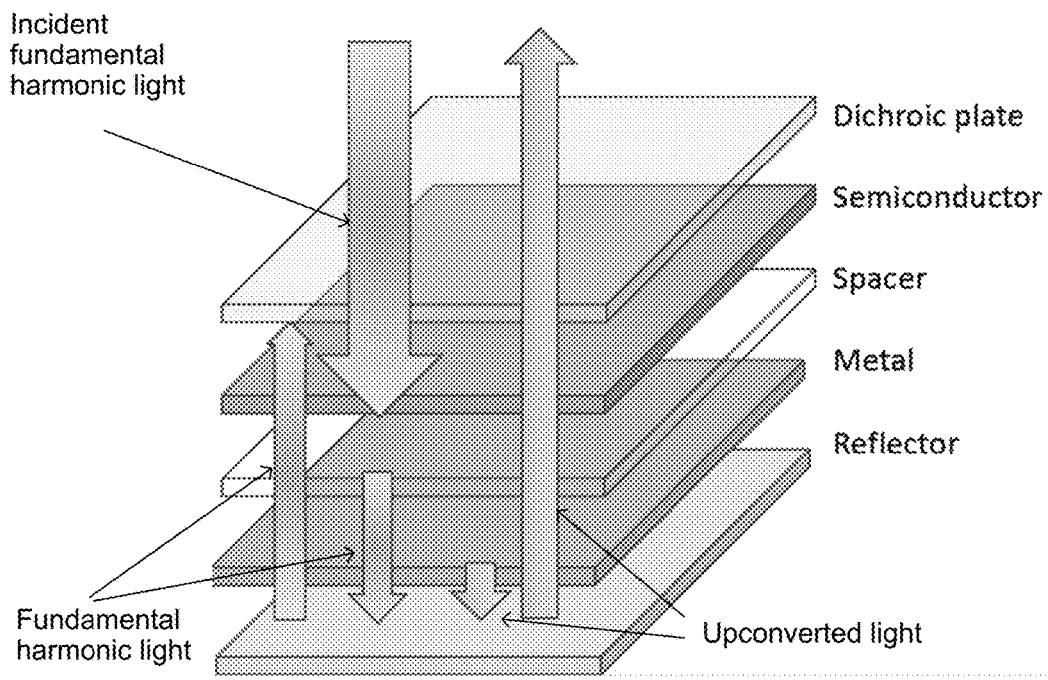
FIG. 14 illustrates a harmonically paired nanoparticle system having a reflective geometry.

In an aspect, the harmonically paired nanoparticle can be included in a device or system. As described briefly above, in one embodiment the first particles can be in a first layer and the second particles can be in a second layer and the dielectric layer is positioned between the first layer and the second layer. For example, FIG. 14 illustrates a harmonically paired nanoparticle system or structure having a reflective geometry (in the alternative, this can have a transmissive geometry). The large red arrow represents incident fundamental harmonic light that is upconverted by the harmonically paired set of particles as represented by the semiconductor layer (second particle), spacer layer (dielectric layer), and metal nanoparticle (first particle) layer into the green arrow. The dichroic plate selectively allows the upconverted light to pass out of the system, but not the fundamental harmonic. The reflector is a mirror for both the fundamental and higher harmonics. In the alternative, the reflector can be replaced with a transmissive material such as glass or similarly transmissive material.

Figure 15:
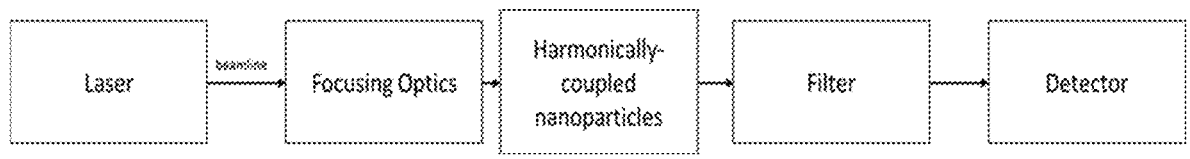
FIG. 15 is a schematic of a measurement system for up-conversion using harmonically paired set of particles, for example using the harmonically paired nanoparticle system shown in FIG. 14.

The harmonically paired nanoparticle system of FIG. 14 can be incorporated into various types of systems and devices (e.g., filters, optically selective switches, optically selective reflectors, non-phase matched harmonic generators, parametric up- or down-converters, tunable beam deflectors, or functionalized absorber-activator pair for drug delivery). For example, FIG. 15 is a schematic of a measurement system or device for up-conversion using harmonically paired set of particles, for example using the harmonically paired nanoparticle system shown in FIG. 14. It should be noted that additional components not depicted can be added after the focusing optics to perform a series of modulations on an optical signal.

The measurement system or device shown in FIG. 15 for measuring the upconverted light produced by harmonically paired nanoparticle films. The measurement system or device can include a laser, focusing optic system, a harmonically paired nanoparticle system, a filter, and a detector. The laser can be pulsed or continuous wave and excites the fundamental harmonic plasmon resonance of the paired nanoparticles. The laser can include Ti:sapphire, Nd:glass, optical parametric amplifiers, free electron, Nd:YAG, ruby, He—Ne, gas-phase Iodine, Er:YAG, Er:Glass, and noble gas lasers. The focusing optic system focusing the laser on the harmonically paired nanoparticle system. The focusing optic system can include one or more of a polarizer, irises, a plano- or bi-convex lens, an achromatic lens, a beam chopper, or a parabolic mirror. The harmonically paired nanoparticle system can include one such as that described in FIG. 14. The filter can be a bandpass filter centered on the harmonics of interest, a long pass filter, or a paired long-pass and short-pass filter centered on the harmonics of interest. The detector can detect the harmonics of interest. The detector can be a photomultiplier tube, a Si charge-coupled device (CCD), an InGaAs detector, a Ge detector, or silicon/InGaAs avalanche photodiodes. The measurement system of FIG. 15 can be used to measure the nonlinear optical properties of materials, such as harmonic generation, optical rectification, multiple photon photoluminescence, nonlinear absorbance and index of refraction, and the polarization dependence of these properties. The measurement system can be used in chemical detection, biological detection or imaging, therapeutics, theranostics, and the like in various environments such as traditional chemical detection and biology as well as in analytic systems (e.g., flow systems) and mechanical systems.

Example 1

Brief Introduction

The role of plasmonic coupling via sympathetic resonance in their second-order, nonlinear optical properties were ascertained through thin films of Au and covellite (CuS) nanoparticles. The addition of a layer of CuS nanoparticles to Au nanoparticle films produced an increase in second harmonic generation (SHG) due to coupling of the localized surface plasmon resonance (LSPR) modes of CuS and Au at 1050 nm and 525 nm, respectively, initiated by two-photon absorption in the covellite. This increase in SHG is greater than the additive contributions of the individual layers. The intimate contact of Au and CuS nanoparticle layers enhances nonlinearity due to non-resonant plasmon coupling between the nanoparticles. The enhancement exhibits a threshold with an onset near 4 $GW/cm^2$. The 60 nm thick hybrid films were nine times more efficient per unit thickness in second harmonic production than beta-barium borate (BBO). The films also exhibit modest third-order nonlinear absorption. These results suggest a design strategy that can be applied to produce a variety of hybrid, second harmonic generating materials in a thin, planar geometry without the necessity of phase matching.

The nanoscale effect of broken inversion symmetry at surfaces allows for generation of second harmonic photons from materials that would normally be unable to participate in second order nonlinear phenomena, due to their centrosymmetry. That is, the second order susceptibility, which is negligible in bulk centrosymmetric materials, becomes significant in nanoscale structures due to the broken symmetry created by the surface[1]. Localized surface plasmon resonance (LSPR) can further enhance the effect of the broken symmetry. The second-order nonlinear response of gold and silver nanoparticles that exhibit LSPR has been well explored, including the effects of placing them in ordered arrays[2-4] and coupling[5,6] nanoparticles as well as by plasmon resonance[7], Fano resonances[8], and specific nanoparticle geometries[9,10].

Hybrid structures comprising metallic and semiconductor nanoparticles are known to exhibit enhanced SHG[11-13] due to dipole-dipole interactions that couple an excitonic state of the semiconductor to the plasmonic resonance of the metal[14]. Here, for the first time, we study hybrid structures that couple the plasmonic state of the semiconductor to the plasmonic resonance of the metal. Given the appropriate material selection, the second harmonic of the plasmonic state of one nanoparticle matches the fundamental plasmonic resonance of another nanoparticle material. We hypothesize that when in close proximity, the Au nanoparticles will serve to increase two photon emission from the CuS nanoparticles by increasing the density of states, thereby increasing the probability of transition (Purcell enhancement).

While the plasmonic effects of metal nanoparticles on energy transfer have previously been explored[15-17], the effect of plasmonic coupling of harmonically resonant metal and semi-metallic nanoparticles is relatively unexplored. The development of Au—CuS hybrid nanoparticle optics allows us to probe this coupling interaction. Understanding this enhancement could lead to the development of ultrathin SHG materials. Additionally, Au nanoparticles have a long history as a platform for biological imaging[18] and theranostics[19]. A hybrid system of CuS and Au nanoparticles could take advantage of long penetration depths afforded by stimulation in the biological transparency window.

Semiconducting covellite exhibits metal-like electronic properties due to an intrinsically high concentration of holes ($h^+$). These holes act as positive charge carriers, giving covellite a p-type character[20] and a plasmon resonance that absorbs strongly from 900-1600 nm. Plasmonic states have been used as intermediates in two-photon absorption[21], and in all-in-one plasmonic and excitonic systems for second harmonic generation. In this semiconductor, the second harmonic of the bluest portion of the plasmon resonance overlaps with the excitonic absorption (onset 2.5 eV, 500 nm). A three-fold enhancement of SHG was demonstrated at an excitation wavelength of 855 nm, where this plasmonic-exitonic energy-matching condition occurs[21]. This method resembles approaches taken in designing hybrid nanoparticle systems, in which the excitonic state of the semiconductor couples to the plasmonic state of the metallic nanoparticle. Excitations of lower energy, such as the 1050 nm light used here, are not sufficient to produce an excitonic state via the second harmonic of the plasmon resonance.

Here we demonstrate enhanced second harmonic generation by plasmon-plasmon coupling in a hybrid system comprising a layer of gold nanoparticles covered by a layer of CuS nanoparticles. The plasmon resonance peak of Au nanoparticles ($\Delta_{LSPR, Au}$=530 nm) sits near half the wavelength of the plasmon resonance peak of LSPR in CuS (900-1600 nm). Thus, like hybrid exciton-plasmon coupled systems, or CuS exciton-plasmon coupling, the LSPR of CuS can couple to the LSPR of Au. The effect of CuS exciton-plasmon self-coupling is minimized in this report by choosing a laser wavelength far from the plasmon-exciton matching condition. The CuS nanoparticles can be considered as broadcast antennae to the Au nanoparticle receivers.

Experimental Methods

Chemicals. 1-Octadecene ($C_{18}H_{36}$, 90%), oleylamine ($C_{18}H_{35}NH_2$, 70%), oleic acid ($C_{18}H_{34}O_2$, 90%), sulfur powder (S, 98.98%), 1,2-hexadecanediol ($C_{16}H_{34}O_2$, 90%), hydrogen peroxide ($H_2O_2$, 30%), 1,8-diazobicycloundec-7-ene ($C_9H_{16}N_2$, 98%), gold (III) chloride trihydrate ($AuCl_3 \cdot 3H_2O$, 99.9%), copper (I) chloride (CuCl, 97%), 2-aminoethanethiol ($C_2H_7NS$, 98%), and chloroform ($CHCl_3$, 99.8%) were purchased form Sigma-Aldrich. Toluene ($C_7H_8$, 99.9%) was purchased from Fischer Chemical. Sulfuric acid ($H_2SO_4$, 95%) was purchased from EMD. (3mercaptopropyl)trimethoxysilane ($C_6H_{16}O_3SSi$) was purchased from Alfa Aesar. All chemicals were used as purchased.

CuS nanoparticle synthesis[20]. A mixture of 16 mL of 1-octadecene, 3.95 mL of oleylamine, and 432 μL of oleic acid was placed in a 50 mL 3-arm round bottom flask and degassed under vacuum at 130° C. for 30 min. The flask was filled with nitrogen and 99.3 mg, 1.00 mmol of CuCl was added to the flask. The reaction mixture was then held under $N_2$ for 5 min at 130° C., with vigorous stirring producing a blue solution. In an Erlenmeyer flask, 161.2 mg, 5.00 mmol of sulfur powder was dissolved in 5 mL of oleylamine on a hotplate at 60° C. upon which time it was drawn into a 10 mL syringe. The reaction mixture was heated to 180° C. and the sulfur-oleylamine solution was injected. The reaction mixture was held at 180° C. for 17 min over which time the solution turned dark green. The flask was allowed to cool to room temperature. To clean and separate the CuS particles from the octadecene solvent, excess ligands, unreacted reagents, and byproducts, 35 mL of ethanol was added to the reaction mixture and then centrifuged at 8000 rpm for 5 min. The liquid components were decanted and the CuS nanoparticles were dispersed in 10 mL of toluene. The cleaning procedure was repeated twice: dispersing of the particles in 10 mL of toluene and extraction of the impurities with 35 mL of ethanol.

Au nanoparticle synthesis.[22] 34.8 mg, 0.102 mmol of $AuCl_3 \cdot XH_2O$, 99.6 mg, 0.385 mmol of 1,2-hexadecanediol, 5 mL of 1-octadecene, and 1 mL of oleylamine were combined in a 50 mL 3-arm round bottom flask. The reaction mixture was heated to 70° C. and degassed under vacuum and vigorous stirring for 30 min. Vacuum was then replaced by $N_2$ and heated to 110° C. for 5 min. The reaction mixture turned dark wine red and was allowed to cool to room temperature. The reaction mixture was then cleaned and separated with 35 mL of ethanol and centrifugation at 8000 rpm for 5 minutes. This process was repeated twice: once with 35 mL of ethanol and once with 15 ml of methanol and 20 ml of ethanol.

Thin-film deposition. Fischer Scientific glass microscope slides (3 cm×1 cm×1 mm) were sectioned into four parts with a diamond tipped scribe. The glass sections were cleaned by placing them in a petri dish with 30 mL of piranha solution (1:4 $H_2O_2:H_2SO_4$) for 10 min on each side[23]. The glass sections were then rinsed with deionized water and dried in an oven for 10 min at 107° C. Cleaned glass sections were exposed on both sides for 40 min to a toluene (70%)/chloroform (30%) bath into which 40 μL of (3-mercaptopropyl)trimethoxysilane was added immediately after the glass slides were placed in the bath[24]. The sections were rinsed with toluene and dried with a stream $N_2$ and placed in an oven for 7 min. The functionalized glass sections were then held vertically (to expose both sides of the glass) in a gold nanoparticle deposition bath with 30 mL of xylene and 44.2 μmol of Au nanoparticles (aliquot re-dispersed in toluene from synthesis assuming 100% yield) for 24 h. The slides, faintly pink in color as is typical of Au nanospheres in air, were rinsed with toluene and dried with a stream of $N_2$. For samples containing only Au nanoparticles the process was stopped here. For hybrid samples, the slides were held vertically in a bath containing 2-aminoethanethiol saturated in 30 mL of ethanol for 24 h. In order to prevent surface charging, the slides were then placed in a 1% (volume) solution of the base diazobicycloundec-7-ene (DBU) in toluene for 1 h. Finally, the slides were placed in a bath of 250 μmol of CuS nanoparticles dispersed in 30 mL of xylene for 48 h. For samples containing only CuS nanoparticles, the Au nanoparticle and 2-aminoethanethiol deposition steps were skipped, proceeding instead straight from (3-mercaptopropyl)trimethoxysilane to CuS nanoparticles.

Structure Characterization. Powder X-ray diffraction (XRD) patterns were acquired in a Rigaku SmartLab X-ray diffractometer with a $CuK_\alpha$ source and a D/teX Ultra 250 detector. The operating voltage was 40 kV and current was 44 mA. Samples were prepared by drop casting concentrated nanoparticle colloids onto glass microscope slides. Scanning electron microscopy (SEM) was performed with a Zeiss Merlin SEM at 1.10 kV with the InLens secondary electron detector. Contact stylus profilometry was performed on a Bruker Dektak 150 with 6 mg stylus force.

Optical Characterization. UV-vis-NIR spectrophotometry was performed with a Jasco V-670 with an integrating sphere. Measurements were taken from the samples as prepared from 350 to 1800 nm. Second harmonic generation was measured as diagramed in FIG. 3a with the front surface of the sample in the focal plane, z=0. The excitation laser was a mode-locked Time-Bandwidth GLX-200 oscillator operating at a wavelength of $\lambda_{ex}$=1050 nm at an average power of 330 mW, nominal pulse duration 80 fs, and 100 MHz pulse repetition frequency. The laser beam was mechanically chopped at a frequency of 265 Hz, with a duty cycle of 20%; thus, each exposure of the sample lasts roughly 750 μs. Repeated exposures produce an annealing effect on the film, but a steady state is reached, permitting stable measurement conditions. The laser beam was focused on the sample by a lens with a measured focal length of 3.5 cm. The intensity of the laser was adjusted by varying the angle between crossed polarizers, producing output intensity in accordance with the Malus' law. A 720 nm short pass filter (OD 2) was placed between the sample and detector to further reduce any transmitted primary beam while still allowing the second harmonic to reach the detector. A 0.5 mm thick crystal of β-barium borate (BBO) was used to generate a reference SHG signal to align and calibrate the optics. The detector was a photomultiplier tube (PMT, Hamamatsu, RU-9880U110) operating at 1 kV. This PMT is most sensitive near the second harmonic wavelength (560 nm); the sensitivity at the wavelength of the IR laser is more than three orders of magnitude lower.

Results and Discussion

Figure 5:
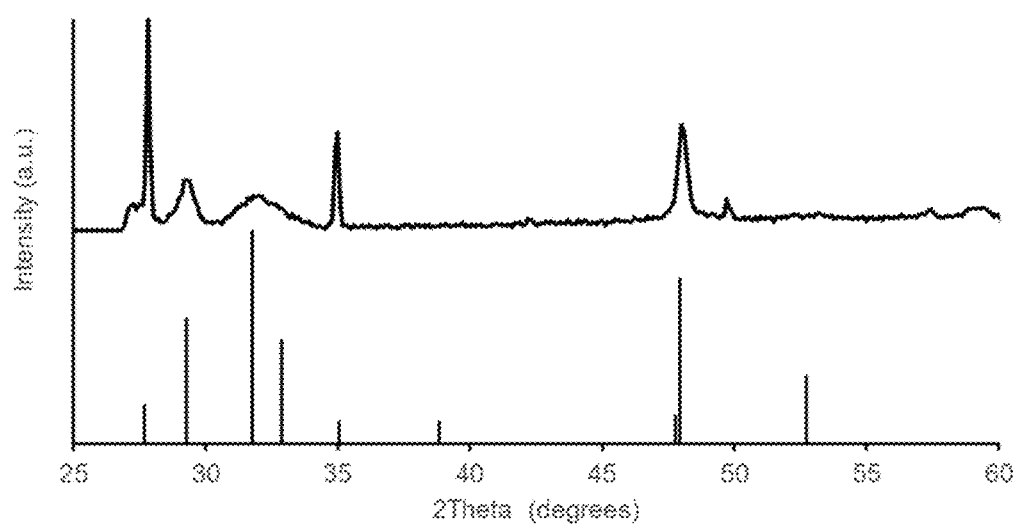
FIG. 5 illustrates an X-Ray diffractogram of covellite nanoparticles with ICSD Card No. 63327 reference lines.
Figure 6A:
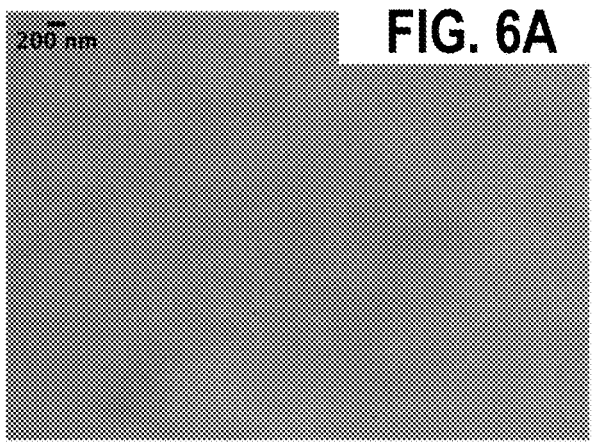
FIGS. 6A-6C illustrate SEM images of fabrication process of hybrid nanoparticle films.
Figure 6B:
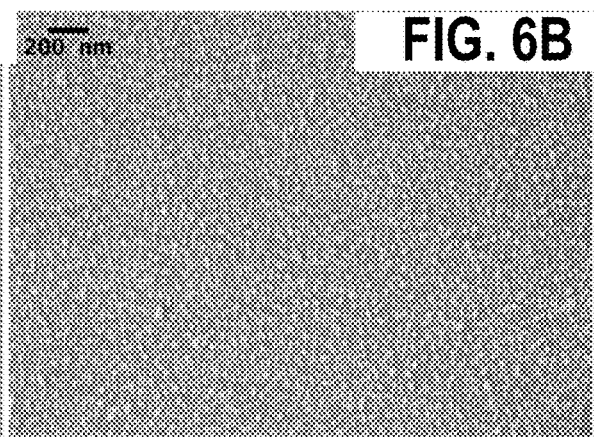
Figure 6C:
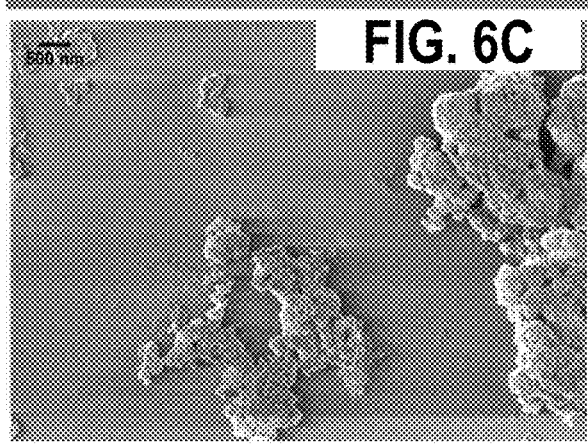
Figure 6D:
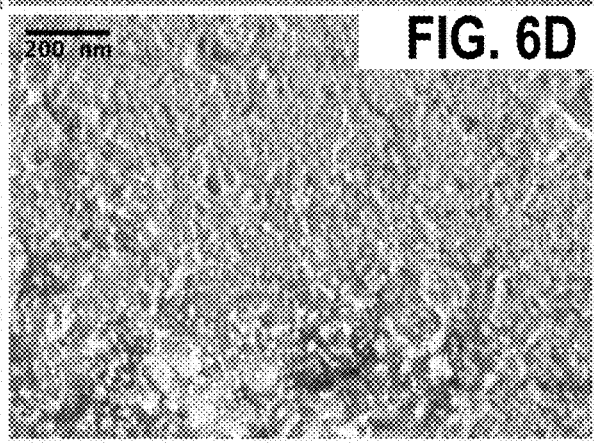
FIG. 6D illustrates the final film containing both Au and CuS nanoparticles connected by linker molecule 2-aminoethanethiol.

Disk-shaped CuS nanoparticles were synthesized using standard solvothermal procedures based on existing literature[20,22]. The copper sulfide nanoparticles were confirmed as stoichiometric covellite CuS by XRD (FIG. 5), belonging to the centrosymmetric space group $P6_3/mmc$. TEM micrographs show the disk-like geometry of the CuS nanoparticles (FIG. 1a) with a hexagonal shape. The CuS nanoparticles have an average width of 14±3 nm and an average thickness of 4.9±1.0 nm as measured from the TEM images. This anisotropic geometry causes the formation of both transverse and longitudinal plasmon modes in the CuS nanoparticles; however, the CuS nanoparticles only exhibit one broad, intense extinction band due to overlapping and convolution of the two features.

Similarly, the sphere-like Au nanoparticles were synthesized by established procedures and have an average diameter of 6.6±0.8 nm as measured from the TEM images. The isotropic shape facilitates the dominance of only one plasmon resonance centered at 560 nm (FIG. 2a). A weak additional plasmon peak in the NIR is observed in Au nanoparticle films, which can be attributed to dimerization of the Au nanoparticles and the development of a longitudinal plasmon mode in the dimer.

A facile bath method, as diagramed in FIG. 1c, was developed to coat both sides of a glass substrate with layers of Au and CuS particles. The surfaces of the substrate were first silanized with (3-mercaptopropyl)trimethoxysilane to create functionalized surfaces that present organothiols to solution. Upon bathing the functionalized glass substrate in an Au nanoparticle solution, the strong affinity of Au nanoparticles for thiols caused a layer of Au nanoparticle to coat the glass. The presence of Au nanoparticles on the functionalized glass slide was confirmed by both the presence of the Au plasmon resonance peak ($\lambda_{LSPR, Au}$=530 nm) in UV-vis-NIR spectroscopy as shown in FIG. 1a. SEM micrographs (FIG. 6) show an even coverage of Au nanoparticles on the glass surface. Profilometry indicated the film was multilayered as the ~30 nm thickness of a film layer is greater than the diameter of the Au nanoparticles (~7 nm).

Subsequent functionalization of the gold surface with 2-aminoethanethiol and then treatment of that layer with non-coordinating organic base ensured an electrostatically favorable amine functionalized surface upon which the CuS nanoparticles could adhere. Failure to treat the organic linker layer with DBU allowed charge to build up on the surface of the microscope slide and hindered uniform deposition. This charge decreased the surface adhesive force relative to the adatom cohesive force, causing Volmer-Weber island growth of groups of CuS nanoparticles. By performing the appropriate charge neutralization procedure with DBU, the CuS anoparticles adhered to the linker surface more evenly with layered Frank-van der Merwe growth. The deposition of CuS onto the sample was confirmed by the CuS plasmon extinction peak ($\Delta_{LSPR, CuS}$=1300 nm) in UV-Vis-NIR spectroscopy.

Figure 3B:
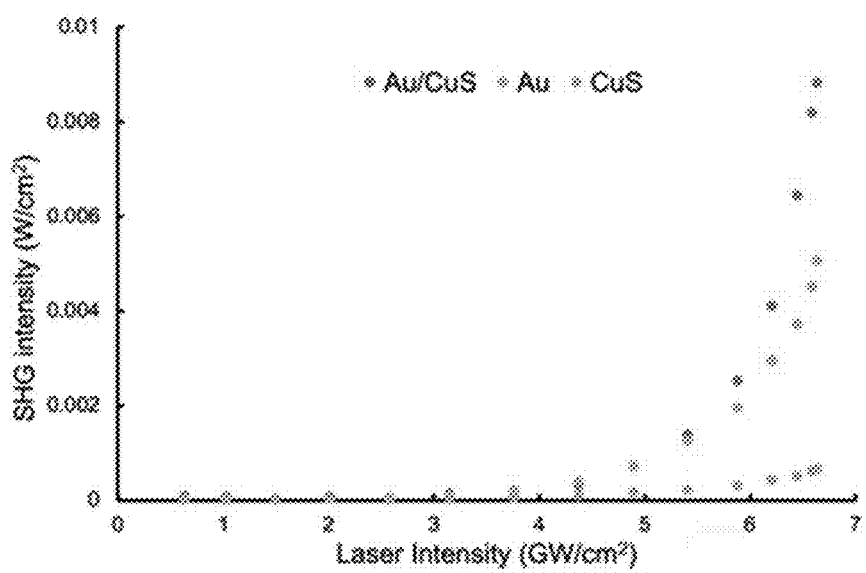
FIG. 3B illustrates the intensity of the second harmonic light generated versus the input laser intensity for each film type: Au only (orange), CuS only (green) and both (blue).
Figure 7A:
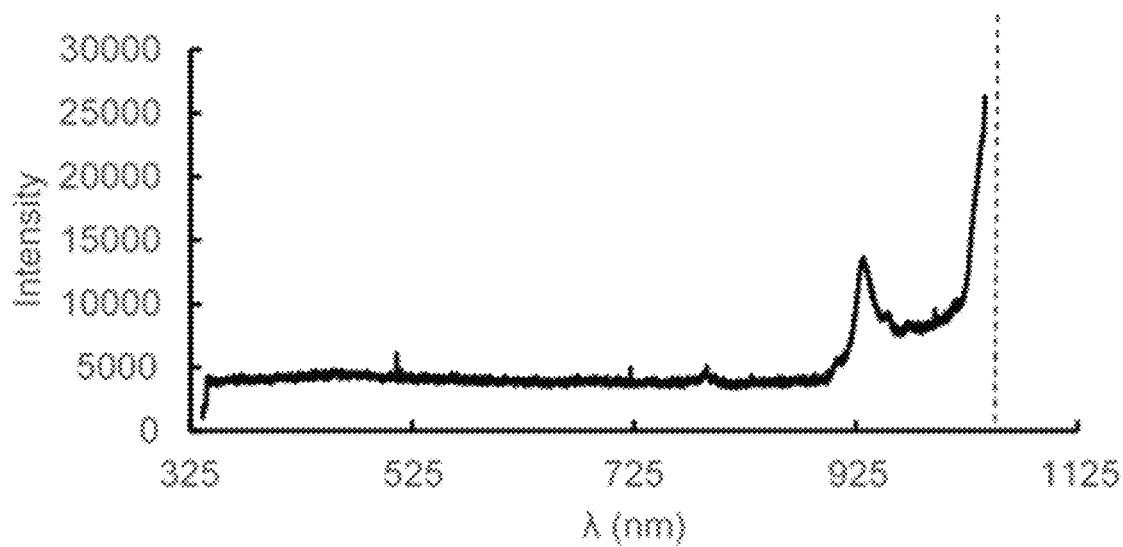
FIGS. 7A-7B illustrate the intensity vs. wavelength spectrum of (FIG. 7A) laser without spectral attenuation and (FIG. 7B) second harmonic signal from BBO crystal with laser fundamental attenuated by filter. Dashed lines correspond to peak laser emission at 1050 nm.
Figure 7B:
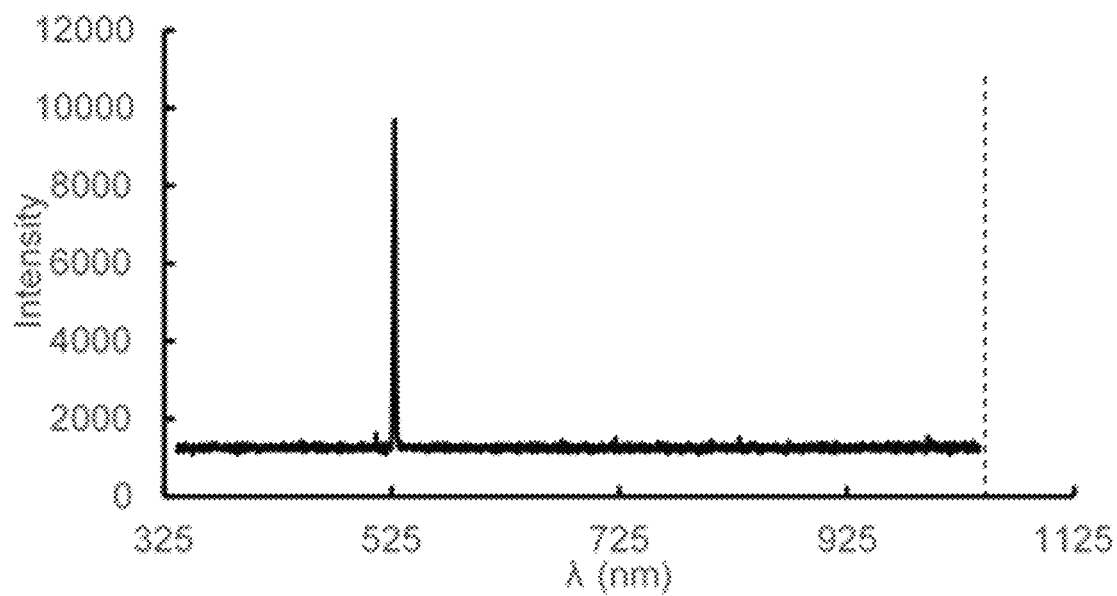

The nanoparticle films were exposed to 80 fs pulses of laser radiation at 1050 nm to induce the generation of second harmonic light at 525 nm. The SHG was measured with a photomultiplier tube. We can be confident that the measured signal from the PMT is second harmonic rather than fundamental light because the PMT is not sensitive in the IR region and a short pass optical filter is present which reduces the IR signal. Spectroscopy, as shown in FIGS. 7A and 7B, supports this conclusion by demonstrating attenuation of the fundamental beam and the presence of a second harmonic peak when a second harmonic generating material is placed in the beamline. The intensity of the beam was varied, and the intensity of the visible light monitored. All nanoparticle films—CuS, Au and the hybrid Au/CuS—demonstrated the classic supralinear response of nonlinear second harmonic generation (FIG. 3b).

Figure 3C:
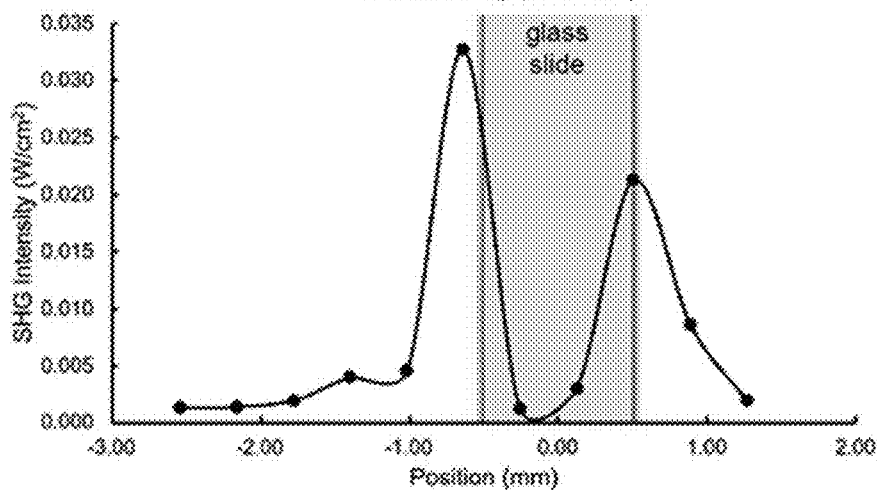
FIG. 3C illustrates the second harmonic generation intensity as the focal plane is moved in the z-direction through the front surface, middle, and back surface of a glass slide, doubly functionalized with hybrid nanoparticle films. Z-scan of hybrid film sample.

Clues to the origin of the upconverted photons can be obtained by scanning the sample through the focal plane of the laser. A characteristic profile of moving a hybrid nanoparticle sample through the focal plane of the laser along the laser propagation direction (z-axis) as portrayed in FIG. 3c. The position of the sample is zeroed when the center of the glass slide is at the focal plane. However, maxima in SHG yield do not occur there but rather when the front or back surfaces of the glass are approximately in the focal plane. As both sides of the glass are coated in nanoparticles, two peaks (one for each side of the glass) result in the Z-scan. Similarly, the integrated SHG yields for the two maxima in FIG. 3c are roughly equal, as would be expected from the material symmetry. The width of the peaks, which are much larger than the thickness of the films (~60 nm), is determined by the Rayleigh depth of $Z_r$=0.57 mm. This confirms that the second harmonic photons are not generated in the glass substrate, but rather in the nanoparticle films on the glass surface. The gold nanoparticle film produced a strong SHG response consistent with literature reports (FIG. 3b)[2,9,25]. The small size of the gold nanoparticles ($D_{Au}$=6.6 nm) means that nonlinear polarization is dominated by the surface dipolar contribution[26]. Thus, we can ignore the bulk, quadrupolar contribution and write the second-order polarization as: where $\chi_{surf,\perp\perp\perp}$ is the reduction of the susceptibility tensor to a single element corresponding to the perpendicular surface term. $P_{surf,\perp}(r,\omega)$ and $E_{ex,\perp}(r, \omega)$ are the polarization and electric field perpendicular to the nanoparticle surface, respectively[26]. The second order polarization, and thus the intensity of second-harmonic light that is generated is dependent on the local electric field at the pump-laser frequency.

The SHG response of the CuS films was modest, nearly 15× less than that of the gold films at the strongest laser intensity employed. At 1050 nm laser stimulation, two photon absorption is not sufficient to excite valence band electrons of CuS into the conduction band, thus, two photon absorption can only proceed into mid-band gap surface or trap states[27]. Therefore, Covellite has a small intrinsic two photon absorption at 1050 nm. When considering only its weaker intrinsic two photon absorption, as in FIG. 3b, low second harmonic activity is expected. Alternatively, metallic gold nanoparticles have high two photon absorption through interband transitions with many free electrons. The larger two photon absorption cross section supports the much stronger SHG response observed for Au over CuS.

The hybrid films produced a very strong SHG response that is 1.8× greater than that Au films, and nearly 30× greater than that of the CuS films. Importantly, the emission from the hybrid films is still greater than the incoherent sum of the two components. This suggests that there is an emergent, non-resonant coupling between the Au and CuS nanoparticles.

Close proximity between the CuS and Au nanoparticles allows their plasmon-induced electric fields to influence one another and can be described as a single system. The hybrid has a large density of states at the ground state (both Au and CuS contribute), fundamental (from CuS), and at the second harmonic (From Au). Through Fermi's golden rule, two photon absorption and emission become enhanced through increased transition probability due to the increased density of states. This improves the competitiveness of radiative pathways against non-radiative pathways, namely plasmon damping from scattering off of bulk defects and surfaces scattering, which occurs on the 10 s of fs time scale.

The effect of this Purcell enhancement in resonant nanoparticles is depicted in FIG. 3b. The sample with only metallic nanoparticles and the hybrid samples have similar second harmonic efficiencies until a threshold region is reached at approximately 4 GW/cm$^2$. Above that threshold, the enhancement effect due to the presence of the CuS nanoparticles becomes substantial, and the effect of the enhancement increases as the fundamental harmonic intensity increases. The required onset for the enhancement is because the density of states contributed by the CuS is less than that of the Au to the hybrid system; the extinction coefficient of Au nanoparticle plasmons is two orders of magnitude larger than that of CuS nanoparticle plasmons[28, 29]. It is therefore only at the larger intensities that CuS absorbs enough to significantly contribute to the SHG.

To quantify the enhancement, we modify the analytical enhancement factor (AEF) defined by Jais et. al[12].

$$AEF = \frac{I_{Au-CuS}/P_{Au-CuS}}{I_{Au}/P_{Au}}$$

where I is the SHG intensity and p is the surface density of Au nanoparticles. The enhancement effect strengthens as the input intensity increases. At our experimental maximum laser intensity (6.64 GW/cm$^2$), the AEF was 1.74.

Figure 4:
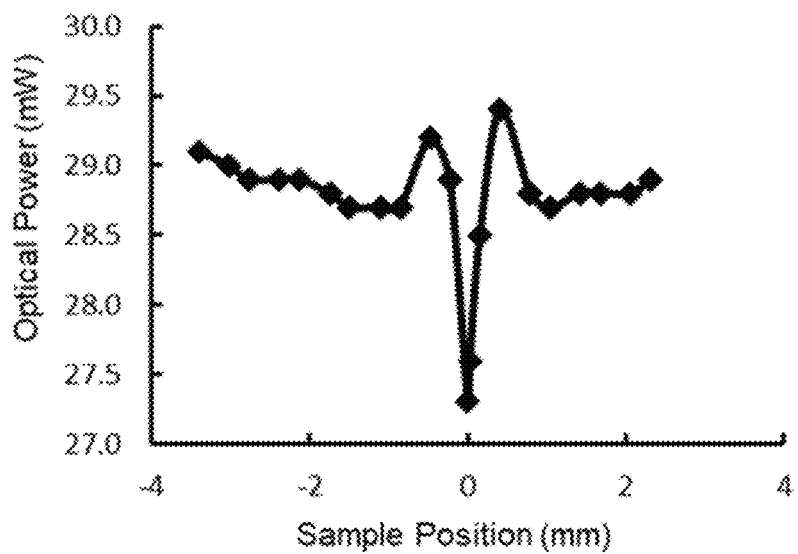
FIG. 4 illustrates the measured optical power of fundamental harmonic as sample passes through the focal plane (at z=0).

Due to the high intensity of the laser in the focal plane, the possible effects of third-order nonlinearities were also considered. The intensity of the laser fundamental was measured as a hybrid film sample moved through the focal plane, demonstrated in FIG. 4. The initial rise in intensity near the focal plane is evidence of a bleaching nonlinearity in the semiconducting CuS nanoparticles, but the effect is ultimately overwhelmed at higher intensities closer to the focal plane by the absorptive nonlinearity of the gold nanoparticles. The third order nonlinear absorption in the hybrid films is a modest effect, with a maximum optical power decrease of about 6%. This nonlinear absorption causes the amount of fundamental harmonic that reaches the "back", down-beam side of the sample to be lower than the "front", up-beam side of the sample. This in turn causes the amount of second harmonic generated to be unequal between the two sides of the glass substrate despite having similar films. This is demonstrated in FIG. 3c as a difference in height between the two peaks. The difference in the amount of fundamental harmonic laser light reaching each side of the sample can be described to first order by a simple model as shown in Section S2.

The efficiency of second harmonic generation from the hybrid nanoparticle films was compared to that of β-barium borate (BBO), a conventional nonlinear crystal. For a laser intensity below the SHG enhancement threshold (4 GW/cm$^2$), when the intensity of SH light produced is normalized to the thickness of the sample, the BBO and hybrid nanoparticle films have nearly equivalent (1.1:1) SHG efficiencies. For a laser intensity above the enhancement threshold (6.64 GW/cm$^2$), when the intensity of SH light produced is normalized to sample thickness and laser power squared, the hybrid nanoparticle film outperforms BBO (9.3:1). Optimization of the films and nanocrystal placement is expected to further increase this design's performance over BBO.

Nanoparticle films containing only Au and CuS nanoparticles were also evaluated. For films with the same optical density of nanoparticles as the hybrid sample, normalized by length and laser power$^2$, the Au nanoparticles produced more SH than BBO (5.4:1), and the CuS nanoparticles produced less SH than BBO (0.69:1). This result emphasizes the relative second order inactivity of CuS nanoparticles when stimulated at 1050 nm.

FIG. 9 illustrates that the optical power of laser after transmission through sample as it moves through the focal plane (z=0). The top two figures are of hybrid samples taken at different spots on the same sample. Optical power of laser after transmission through (bottom left) Au only film and (bottom right) CuS only film.

Figure 8A:
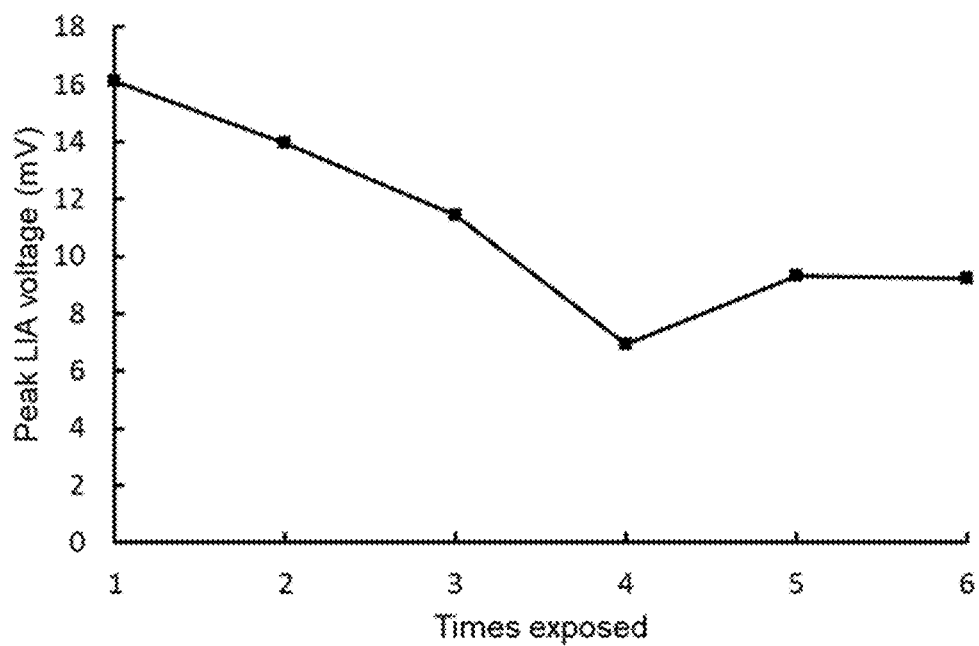
FIGS. 8A-8B illustrates the peak lock-in amplifier (LIA) signal of (FIG. 8A) the same sample spot for consecutive laser exposures, each exposure had a duration of 10 minutes.
Figure 8B:
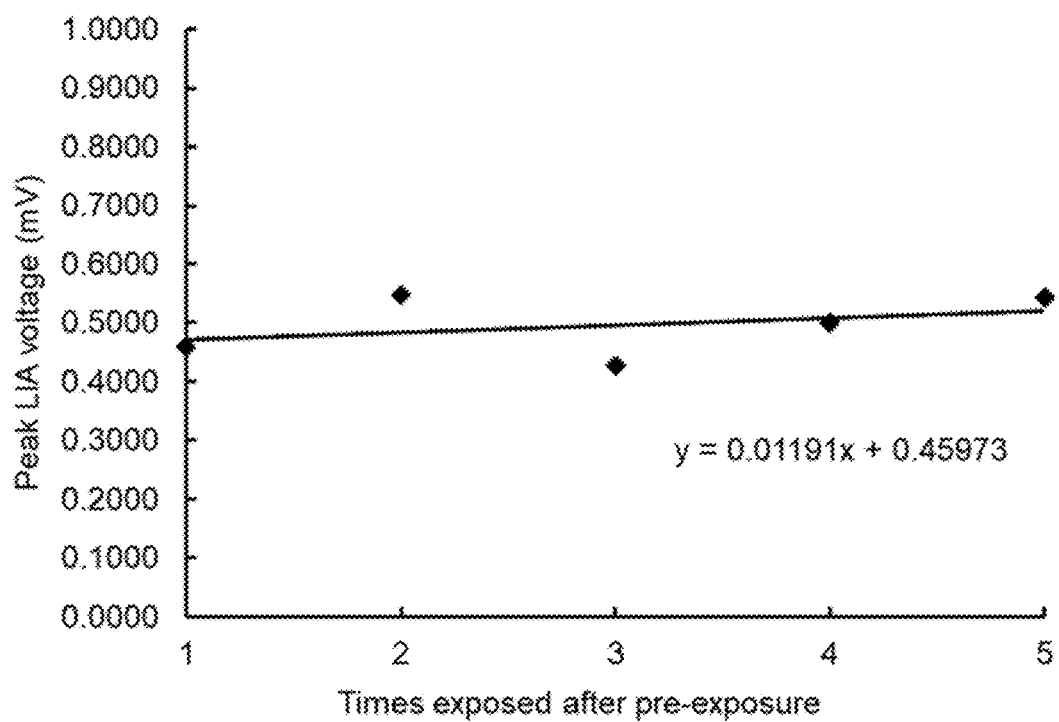
Figure 9A:
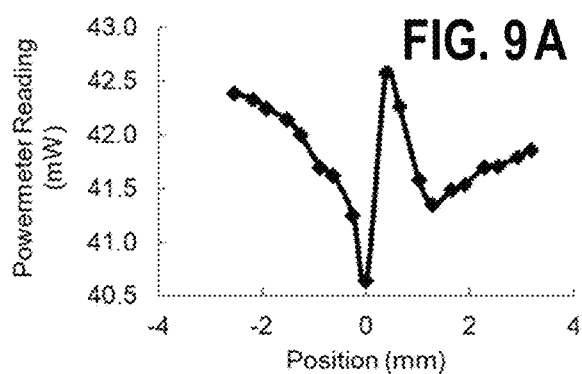
FIGS. 9A-9D illustrate the optical power of laser after transmission through sample as it moves through the focal plane (z=0).
Figure 9B:
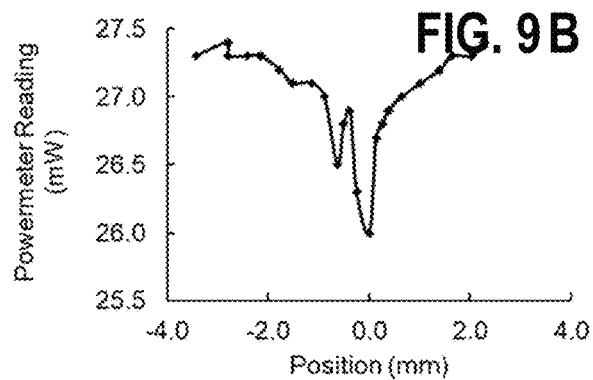
Figure 9C:
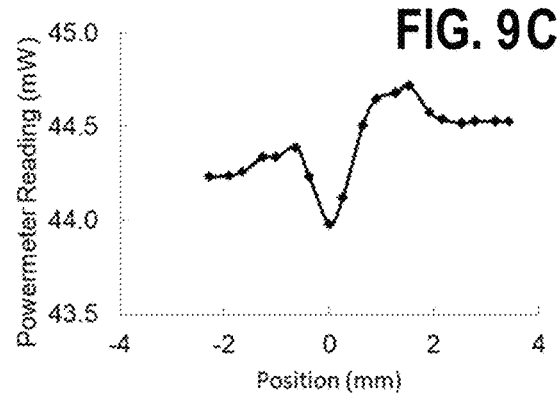
Figure 9D:
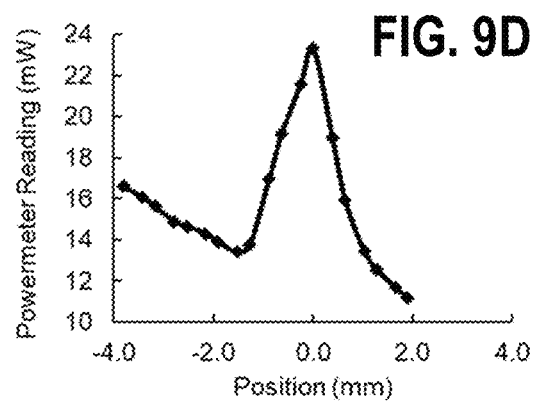

Film inhomogeneities, suggested by the results of the profilometry and confirmed in SEM imaging of the hybrid films, produced changes in nonlinear absorptive response as discussed in FIGS. 10A and 10B. Additionally, a laser-beam induced annealing effect on the film was demonstrated upon repeated exposure of the sample to the laser. Initial decreases in SHG efficiency leveled off after several exposures to the laser, as shown in FIG. 8A-8B. These inhomogeneities were compensated for by controlling the placement of the focal spot on the sample and ensuring pre-measurement exposure to the laser.

Conclusion

This example demonstrates that plasmonic nanocrystals in close proximity can couple to enhance non-linear optical properties such as second harmonic generation. In this example, Au nanospheres have a plasmon resonance at the second harmonic of the fundamental plasmonic resonance of CuS nanoparticles. Mixed nanoparticle films demonstrated an analytic enhancement factor of 1.74, exhibiting greater SH yield than the sum of either nanoparticle film alone. This suggests that there is a coupling effect between the plasmon resonance of the CuS nanoparticles and the Au nanoparticles. These materials also exhibit greater SHG efficiency per unit thickness than BBO, a high-performance nonlinear crystal. In the nanoparticle films, phase matching is not required, allowing for a larger angle tolerance in the SHG response. This development in nanocrystal-based nonlinear optical materials will allow for reduced size of optical components, reaching toward the domain of planar nano-optical devices.

REFERENCES FOR EXAMPLE (1) Bachelier, G.; Russier-Antoine, I.; Benichou, E.; Jonin, C.; Brevet, P.-F. Multipolar Second-Harmonic Generation in Noble Metal Nanoparticles. *J. Opt. Soc. Am. B* 2008, 25 (6), 955. https://doi.org/10.1364/josab.25.000955.
(2) McMahon, M. D.; Ferrara, D.; Bowie, C. T.; Lopez, R.; Haglund, R. F. Second Harmonic Generation from Resonantly Excited Arrays of Gold Nanoparticles. *Appl. Phys. B Lasers Opt.* 2007, 87 (2), 259-265. https://doi.org/10.1007/s00340-006-2569-3.

(3) Li, K.; Stockman, M. I.; Bergman, D. J. Enhanced Second Harmonic Generation in a Self-Similar Chain of Metal Nanospheres. *Phys. Rev. B—Condens. Matter Mater. Phys.* 2005, 72 (15), 1-4. https://doi.org/10.1103/PhysRevB.72.153401.

(4) Fontana, J.; Maldonado, M.; Charipar, N.; Trammell, S. A.; Nita, R.; Naciri, J.; Pique, A.; Ratna, B.; Gomes, A. S. L. Linear and Nonlinear Optical Characterization of Self-Assembled, Large-Area Gold Nanosphere Metasurfaces with Sub-Nanometer Gaps: Errata. *Opt. Express* 2018, 26 (8), 9614. https://doi.org/10.1364/oe.26.009614.

(5) Shaviv, E.; Banin, U. Synergistic Effects on Second Harmonic Generation of Hybrid CdSe—Au Nanoparticles. *ACS Nano* 2010, 4 (3), 1529-1538. https://doi.org/10.1021/nn901778k.

(6) Danckwerts, M.; Novotny, L. Optical Frequency Mixing at Coupled Gold Nanoparticles. *Phys. Rev. Lett.* 2007, 98 (2), 1-4. https://doi.org/10.1103/PhysRevLett.98.026104.

(7) Hubert, C.; Billot, L.; Adam, P. M.; Bachelot, R.; Royer, P.; Grand, J.; Gindre, D.; Dorkenoo, K. D.; Fort, A. Role of Surface Plasmon in Second Harmonic Generation from Gold Nanorods. *Appl. Phys. Lett.* 2007, 90 (18), 88-91. https://doi.org/10.1063/1.2734503.

(8) Martin, O. J. F. Augmenting Second Harmonic Generation Using Fano Resonances in Plasmonic Systems. 2013. https://doi.org/10.1021/nl400636z.

(9) Zhang, Y.; Grady, N. K.; Ayala-Orozco, C.; Halas, N. J. Three-Dimensional Nanostructures as Highly Efficient Generators of Second Harmonic Light. *Nano Lett.* 2011, 11 (12), 5519-5523. https://doi.org/10.1021/nl2033602.

(10) Celebrano, M.; Wu, X.; Baselli, M.; Großmann, S.; Biagioni, P.; Locatelli, A.; Angelis, C. De; Cerullo, G.; Osellame, R.; Hecht, B.; et al. Mode Matching in Multiresonant Plasmonic Nanoantennas for Enhanced Second Harmonic Generation. *Nat. Nanotechnol.* 2015, 10 (5), 412-417. https://doi.org/10.1038/nnano.2015.69.

(11) Jais, P. M.; Von Bilderling, C.; Bragas, A. V. Plasmon-Enhanced Second Harmonic Generation in Semiconductor Quantum Dots Close to Metal Nanoparticles. *Pap. Phys.* 2011, 3 (0), 1-5. https://doi.org/10.4279/pip.030002.

(12) Grinblat, G.; Rahmani, M.; Cortes, E.; Caldarola, M.; Comedi, D.; Maier, S. A.; Bragas, A. V. High-Efficiency Second Harmonic Generation from a Single Hybrid Zno Nanowire/Au Plasmonic Nano-Oligomer. *Nano Lett.* 2014, 14 (11), 6660-6665. https://doi.org/10.1021/nl503332f.

(13) Linnenbank, H.; Grynko, Y.; Förstner, J.; Linden, S. Second Harmonic Generation Spectroscopy on Hybrid Plasmonic/Dielectric Nanoantennas. *Light Sci. Appl.* 2016, 5 (1), e16013-e16013. https://doi.org/10.1038/lsa.2016.13.

(14) Singh, M. R. Enhancement of the Second-Harmonic Generation in a Quantum Dot-Metallic Nanoparticle Hybrid System. *Nanotechnology* 2013, 24 (12). https://doi.org/i0.1088/0957-4484/24/12/125701.

(15) Chang, R.; Leung, P. T.; Tsai, D. P. Effects of Gain Medium on the Plasmonic Enhancement of Forster Resonance Energy Transfer in the Vicinity of a Metallic Particle or Cavity. *Opt. Express* 2014, 22 (22), 27451. https://doi.org/10.1364/oe.22.027451.

(16) Liaw, J. W.; Chen, B. R.; Kuo, M. K. Plasmon-Mediated Excitation Modulation of FRET by Silver Nanoshell. *Microelectron. Eng.* 2015, 138, 122-127. https://doi.org/10.1016/j.mee.2015.03.024.

(17) Szmacinski, H.; Ray, K.; Lakowicz, J. R. Effect of Plasmonic Nanostructures and Nanofilms on Fluorescence Resonance Energy Transfer. *J. Biophotonics* 2009, 2 (4), 243-252. https://doi.org/10.1002/jbio.200910003.

(18) Tong, L.; Cobley, C. M.; Chen, J.; Xia, Y.; Cheng, J. X. Bright Three-Photon Luminescence from Gold/Silver Alloyed Nanostructures for Bioimaging with Negligible Photothermal Toxicity. *Angew. Chemie—Int. Ed.* 2010, 49 (20), 3485-3488. https://doi.org/10.1002/anie.201000440.

(19) Bardhan, R.; Lal, S.; Joshi, A.; Halas, N. J. Imaging and Treatment of Cancer. 2011, 44 (10). https://doi.org/10.1021/ar200023x.

(20) Xie, Y.; Carbone, L.; Nobile, C.; Grillo, V.; D'Agostino, S.; Della Sala, F.; Giannini, C.; Altamura, D.; Oelsner, C.; Kryschi, C.; et al. Metallic-like Stoichiometric Copper Sulfide Nanocrystals: Phase- and Shape-Selective Synthesis, near-Infrared Surface Plasmon Resonance Properties, and Their Modeling. *ACS Nano* 2013, 7 (8), 7352-7369. https://doi.org/10.1021/nn403035s.

(21) Marin, B. C.; Hsu, S. W.; Chen, L.; Lo, A.; Zwissler, D. W.; Liu, Z.; Tao, A. R. Plasmon-Enhanced Two-Photon Absorption in Photoluminescent Semiconductor Nanocrystals. *ACS Photonics* 2016, 3 (4), 526-531. https://doi.org/10.1021/acsphotonics.6b00037.

(22) Motl, N. E.; Ewusi-annan, E.; Sines, I. T.; Jensen, L.; Schaak, R. E. Experimental Determination of Composition and Correlation with Theory. *J. Phys. Chem. C* 2010, 19263-19269.

(23) Brzoska, J. B.; Shahidzadeh, N.; Rondelez, F. Evidence of a Transition Temperature for the Optimum Deposition of Grafted Monolayer Coatings. *Nature* 1992, 360 (6406), 719-721. https://doi.org/10.1038/360719a0.

(24) Goss, C. A.; Deborah, C. H.; Majda, M. Application of (3-Mercaptopropyl)Trimethoxysilane as a Molecular Adhesive in the Fabrication of Vapor-Deposited Gold Electrodes on Glass Substrates. *Anal. Chem.* 1990, No. 63, 85-88.

(25) Palomba, S.; Danckwerts, M.; Novotny, L. Nonlinear Plasmonics with Gold Nanoparticle Antennas. *J. Opt. A Pure Appl. Opt.* 2009, 11 (11). https://doi.org/10.1088/1464-4258/11/11/114030.

(26) Bachelier, G.; Butet, J.; Russier-Antoine, I.; Jonin, C.; Benichou, E.; Brevet, P. F. Origin of Optical Second-Harmonic Generation in Spherical Gold Nanoparticles: Local Surface and Nonlocal Bulk Contributions. *Phys. Rev. B—Condens. Matter Mater. Phys.* 2010, 82 (23), 1-5. https://doi.org/10.1103/PhysRevB.82.235403.

(27) Ludwig, J.; An, L.; Pattengale, B.; Kong, Q.; Zhang, X.; Xi, P.; Huang, J. Ultrafast Hole Trapping and Relaxation Dynamics in p-Type CuS Nanodisks. 2015. https://doi.org/10.1021/acs.jpclett.5b01078.

(28) Liu, X.; Atwater, M.; Wang, J.; Huo, Q. Extinction Coefficient of Gold Nanoparticles with Different Sizes and Different Capping Ligands. *Colloids Surfaces B Biointerfaces* 2007, 58 (1), 3-7. https://doi.org/10.1016/j.colsurfb.2006.08.005.

(29) Xiao, L.; Wu, J.; Ran, J.; Liu, Y.; Qiu, W.; Lu, F.; Shao, F.; Tang, D.; Peng, P. Near-Infrared Radiation Absorption Properties of Covellite (CuS) Using First-Principles Calculations. *AIP Adv.* 2016, 6 (8). https://doi.org/10.1063/1.4962299.

Supplemental Information for Example 1

Model of Film Absorbance

In FIG. 4B, the asymmetry of glass slide's SHG intensity when moving along focal plane is shown. Here the absorbance effect is studied to study the asymmetry. In the SHG experiment, a gaussian beam with beam waist of width $w_0$ passes through the films on each face of the glass slide. The film absorbance A can be calculated from the absorbance data in FIG. 2A. At the laser wavelength of 1050 nm, the absorbance a of the sample in which the laser passes through films on both sides of the sample is approximately 0.2. Then from the definition of absorbance we find that $$a \equiv \log_{10}\left(\frac{1}{T}\right) \cong 0.2 \Rightarrow T^2 = 0.625 \Rightarrow T = 0.79, A = 0.21$$

where we have implicitly assumed that there is no scattering, so that the transmission T and absorption A sum to 1.

The geometry of the experiment is shown in FIG. 10A. The measured Gaussian beam waist ($1/e^2$) at z=0 is 27 μm; the corresponding Rayleigh range is 2.29 mm. The glass slide, thickness 1 mm, is moved through the Gaussian laser beam on either side of the focal plane at z=0. Given the thickness of the microscope slide, the 60 nm thick films on either face can be treated as if they were infinitely thin, i.e., effectively d-function absorbers. The film positions are $z_1$ and $z_2$, and the beam waist as a function of z is given by $$w(z) = w_0\left[1 + \left(\frac{\lambda z}{\pi w_0^2}\right)^2\right]^{1/2}$$

Assuming a beam incident on the sample from the left in FIG. 11, the incident intensities on the two nanoparticle films located at the positions $z_1$ and $z_2$ are given by $$I(z) = \frac{P_{laser}/\pi w_0^2}{\left[1+\left(\frac{\lambda z_1}{\pi w_0^2}\right)^2\right]} + \frac{TP_{laser}/\pi w_0^2}{\left[1+\left(\frac{\lambda z_2}{\pi w_0^2}\right)^2\right]} = \frac{I_0}{\left[1+\left(\frac{\lambda(z-\delta)}{\pi w_0^2}\right)^2\right]} + \frac{TI_0}{\left[1+\left(\frac{\lambda(z+\delta)}{\pi w_0^2}\right)^2\right]}$$

Where δ is half the thickness of the microscope slide, 0.5 mm.

At the interfaces between the film and the glass, light is both reflected and transmitted. The reflection coefficient is given by the Fresnel equation, with the index of the microscope slide and covellite taken to be 1.5 and (1.45+2.62)/2=2.03, respectively. (We have used the average of the ordinary and extraordinary indices for the covellite). Thus, the reflection coefficient is $$R = \left|\frac{n_1 - n_2}{n_1 + n_2}\right|^2 = \left|\frac{1.5 - 2.03}{1.5 + 2.03}\right|^2 = 0.031$$

Given the small size of R, it is reasonable to first approximation to neglect the contributions of the light reflected at the interfaces to the total absorption in the covellite film nearest the incident laser beam. This yields the following result for the absorption as a function of z:

Estimate of Two-Photon Absorption Probability in Covellite

We used a statistically based treatment of multiphoton probabilities (David L. Andrews, "A simple statistical treatment of multiphoton absorption," *American Journal of Physics* 53, 1001-2 (1985) to estimate the efficiency for two-photon absorption in the covellite. In this treatment, the mean number of photons, m, within a given volume V for an incident intensity I at a wavelength λ is $$m = \frac{IV\lambda}{hc^2} = 1.68 \times 10^{-7} I(GW/cm^2)V(nm^3)\lambda(nm)$$

Laser light obeys Poisson statistics, and the probability (P) of an n-photon transition for a mean number of photons m is $$P_{n,laser} = \left(\frac{m^n}{n!}\right)e^{-m}$$

In the present experiment, the maximum intensity according to FIG. 3 was 6.65 GW/cm² and the wavelength of the laser was 1050 nm. The volume of the hexagonal covellite unit cell (a=0.3794 nm, c=1.6341 nm) is 0.204 nm³. For these values, the mean photon number is m=2.39×10⁻⁴ and the two-photon absorption probability (n=2) is $$P_{n,laser} = \left(\frac{m^n}{n!}\right)e^{-m} \Rightarrow P_{2,laser} \cong \left(\frac{m^2}{2!}\right) = 2.61 \times 10^{-12}$$

The experimentally determined probability of SHG emission from the covellite film alone (see the orange trace in FIG. 3(c) for the original data) is $$P_{525nm} = \frac{I_{SHG}}{I_{1050nm}} = \frac{0.0008W/cm^2}{6.65 \times 10^9 W/cm^2} = 1.2 \times 10^{-13}$$

This is consistent with a quantum efficiency 5%. That is, radiative decay of electrons excited by two photon absorption occurs 5% of the time—a number that is reasonable due to competition from non-radiative decay mechanisms (such as electron-phonon coupling).

It is interesting to compare this number for bare covellite to that for the gold nanoparticles. The unit cell of gold has a volume of 0.0679 nm³, leading to $$m = 7.97x10^{-5} \Rightarrow P_{2,laser} \cong \left(\frac{m^2}{2!}\right) = 6.34 \times 10^{-11}$$

This is to be compared with the experimental SHG yield for the gold film (see the black trace in FIG. 3(c) for the original data), which is approximately 15 times larger than the covellite 2ω yield—within a factor 2 of this estimate. Since this statistical estimate has no provision for the fact that the gold is excited resonantly, this seems reasonable.

Example 2

Figure 12:
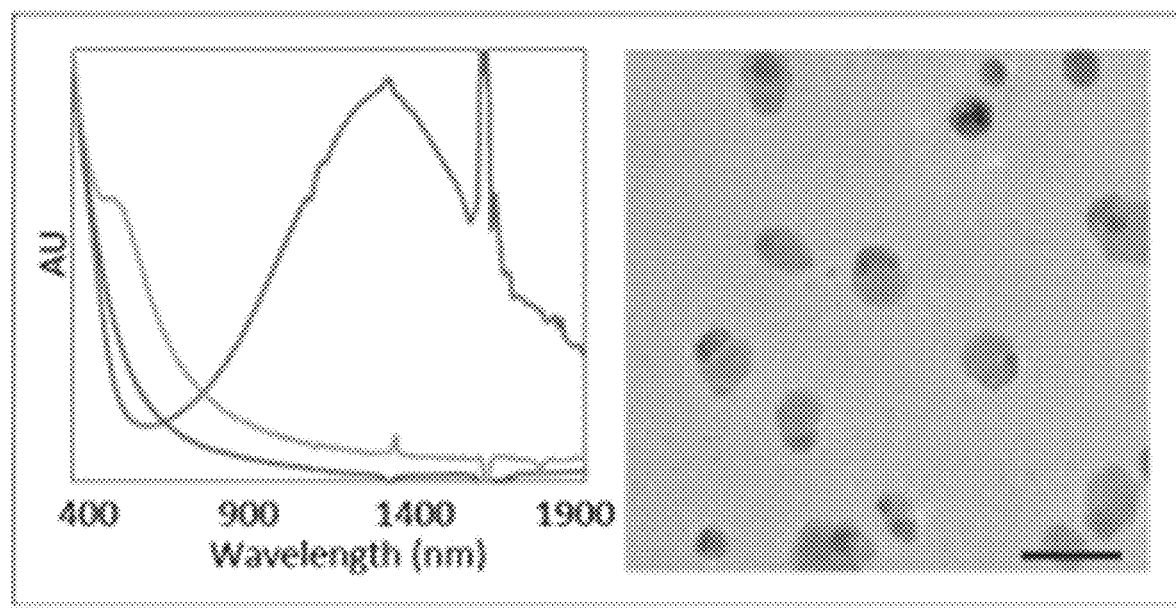
FIG. 12 illustrates (left) a UV-Vis for $Cu_2Se$ (lowest line on right side of graph), $Cu_{2-x}Se$ (top line on the right side of the graph), and $Cu_{2-x}Se$ (middle line on the right side of the graph) and a TEM image (right) of hybrid particles (scale bar is 20 nm).
Figure 13:
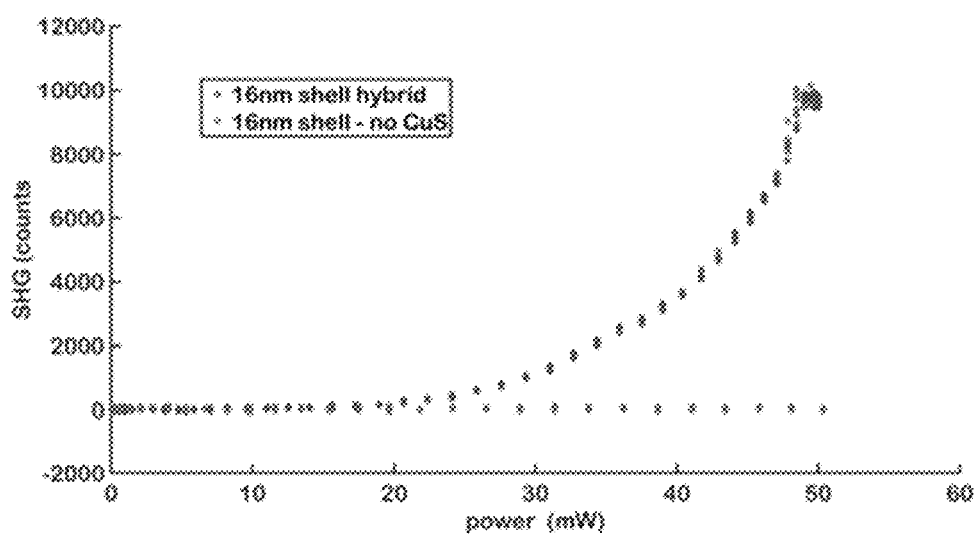
FIG. 13 illustrates a graph of an example of SHG enhancement observed in hybrid Au@$SiO_2$—CuS (top line on right side of graph) as opposed to the Au@$SiO_2$ along (bottom line on right side of graph, flat line).

The presence of the insulating layer prevents damping of the plasmon resonance of the CuS by the Au component. As is shown in the FIG. 12, the copper chalcogenide had a plasmon resonance in the NIR (blue trace, top line on far right of graph) that was removed when the gold caps were added to the nanoparticle (green trace, middle line on far right of graph). This can be compared to FIG. 2A in the Example 1, which does not feature damping of the CuS plasmon. While second harmonic experiments were disclosed in that document, they were not in the heterostructure film with organic dielectric ligand, nor was there direct comparison between heterostructure nanoparticles and single plasmon (at fundamental) nanoparticles. However, there were strong up-conversion results from heterostructures that featured CuS and Au components separated by a dielectric ($SiO_2$) gap, which is shown in FIG. 13.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. A structure, comprising:
a harmonically paired set of particles, wherein the particles are separated by a dielectric layer, where the dielectric layer is of a thickness such that direct electron transfer does not occur between the harmonically paired set of particles.

2. The structure of claim 1, wherein the harmonically paired set of particles has a plasmonic resonance of one of the paired particles that is coincident with the harmonics of the plasmonic resonance of the other of the paired particles.

3. The structure of claim 1, wherein the harmonically paired set of particles includes a first particle and a second particle, wherein the first particle is selected from the group consisting of: Au, Ag, Al, Cu, Pt, Pd, Ga, In, Tl, Sn, Pb, and Bi; wherein the second particle is selected from the group consisting of: CuS, ZnO, Sn-doped $In_2O_3$ (ITO), In-doped $SnO_2$, compound III-V semiconductors, compound III-V semiconductors, and copper chalcogenides.

4. The structure of claim 1, wherein the harmonically paired set of particles includes a first particle and a second particle, wherein the first particle is selected from the group consisting of: Au, Ag, Al, Cu, Pt, Pd, Ga, In, Tl, Sn, Pb, and Bi, wherein the first particle is selected from the group consisting of: Au, Ag, Al, Cu, Pt, Pd, Ga, In, Tl, Sn, Pb, and Bi, wherein the first particle and the second particle are not the same.

5. The structure of claim 1, wherein the dielectric layer is about 3 to 500 nm thick and wherein the first particle and the second particle independently have a longest dimension of about 4 to 20 nm.

6. The structure of claim 1, wherein the dielectric layer is made of a ligand that is a bi-functional organic ligand, wherein the bi-functional organic ligand is selected from: aminoethanethiol and mercapto-acids, dithiols, and the amino-thiols.

7. The structure of claim 4, wherein the bi-functional organic ligand is selected from: mercaptopropionic acid, mercapto alkyl-acids, mercaptoundecanoic acid, mecaptophenylacetic acid, ethanedithiol, an alkyl-dithiol, benzenedithiol, poly(ethylene glycol) dithiol, biphenyldithiol, toluenedithiol, thiadiazoledithiol, aminoethanethiol, an aminoalkylthiols, aminothiophenol, and aminobenzylmercaptan.

8. The structure of claim 1, wherein the dielectric layer is made of an inorganic dielectric material, wherein the inorganic dielectric material is selected from: $SiO_2$, $TiO_2$, $SnO_2$, and $Al_2O_3$.

9. The structure of claim 1, wherein the harmonically paired set of particles includes a first particle and a second particle, wherein the first particles are in a first layer and the second particles are in a second layer, wherein the dielectric layer is positioned between the first layer and the second layer.

10. The structure of claim 1, wherein a plurality of harmonically paired set of particles are within a first mixed layer, wherein each harmonically paired set of particles includes a first particle and a second particle, wherein each harmonically paired set of particles has its own dielectric layer independent of the dielectric layer of other harmonically paired set of particles.

11. The structure of claim 1, wherein a plurality of harmonically paired set of particles are within a colloidally suspended solution, wherein each harmonically paired set of particles includes a first particle and a second particle connected to one another by its own dielectric layer independent of the dielectric layer of other harmonically paired set of particles.

12. The structure of claim 1, wherein the harmonically paired set of particles exhibit greater harmonic generation, multiphoton photoluminescence, or both as compared to the sum of the output from the component parts of the harmonically paired set of particles.

13. The structure of claim 1, wherein the second harmonic of the harmonically paired set of particles is greater than the second harmonic sum of the output from the component parts of the harmonically paired set of particles.

14. The structure of claim 1, wherein the third harmonic of the harmonically paired set of particles is greater than the third harmonic sum of the output from the component parts of the harmonically paired set of particles.

15. The structure of claim 1, wherein the structure is an optical component selected from: filter, optically selective switch, optically selective reflector, non-phase matched harmonic generator, parametric up- or down-converter, tunable beam deflector, or functionalized absorber-activator pair for drug delivery.

16. A harmonically paired nanoparticle system comprising:
a substrate, a harmonically paired set of particles disposed adjacent the substrate, and a dichroic plate, wherein the particles of the harmonically paired set of particles are separated by a dielectric layer, where the dielectric layer is of a thickness such that direct electron transfer does not occur between the harmonically paired set of particles.

17. The harmonically paired nanoparticle system of claim 16, wherein the harmonically paired set of particles include a first particle in a first layer and a second particle in a second layer, wherein a dielectric layer is positioned between the first layer and the second layer.

18. The harmonically paired nanoparticle system of claim 16, wherein the substrate is transmissive or reflective.

19. A measurement system comprising:
- a laser, a focusing optic system, a harmonically paired nanoparticle system, a filter, and a detector;
- wherein the laser directs a laser light onto the focusing optic system which directs the laser light onto the harmonically paired nanoparticle system, wherein the harmonically paired nanoparticle system up converts the laser light, wherein the filter allows select harmonics to pass to the detector, where the detector detects the select harmonics;
- wherein the harmonically paired nanoparticle system comprises a substrate, a harmonically paired set of particles disposed adjacent the substrate, and a dichroic plate, wherein the particles of the harmonically paired set of particles are separated by a dielectric layer, where the dielectric layer is of a thickness such that direct electron transfer does not occur between the harmonically paired set of particles.

20. The measurement system of claim 19, wherein the measurement system is configured to measure one or more of the following: harmonic generation, photoluminescence, polarization, nonlinear absorption, and nonlinear index of refraction.

* * * * *